(12) United States Patent
Kamath et al.

(10) Patent No.: US 12,216,602 B2
(45) Date of Patent: Feb. 4, 2025

(54) METHODS AND APPARATUS TO DETECT L2 ENTRY AND RESET IN UNIVERSAL SERIAL BUS REPEATERS

(71) Applicant: Texas Instruments Incorporated, Dallas, TX (US)

(72) Inventors: Anant Kamath, Bangalore (IN); Suzanne M. Vining, Plano, TX (US); Rakesh Hariharan, Bangalore (IN); Mark Wentroble, Plano, TX (US); Christopher Rodrigues, Bangalore (IN); Prajwala P, Cambridge (GB)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/581,202

(22) Filed: Jan. 21, 2022

(65) Prior Publication Data

US 2023/0237002 A1      Jul. 27, 2023

(51) Int. Cl.
*G06F 13/38* (2006.01)
*G06F 13/40* (2006.01)

(52) U.S. Cl.
CPC ........ *G06F 13/385* (2013.01); *G06F 13/4068* (2013.01); *G06F 2213/0042* (2013.01)

(58) Field of Classification Search
CPC ............... G06F 13/385; G06F 13/4068; G06F 2213/0042; G06F 13/4282
See application file for complete search history.

(56) References Cited

U.S. PATENT DOCUMENTS

| | | | |
|---|---|---|---|
| 2013/0067128 A1* | 3/2013 | Sosniak | G06F 13/4045 710/106 |
| 2017/0277249 A1* | 9/2017 | Low | G06F 13/4282 |
| 2022/0391217 A1* | 12/2022 | Wentroble | G06F 13/382 |

\* cited by examiner

*Primary Examiner* — Idriss N Alrobaye
*Assistant Examiner* — Richard B Franklin
(74) *Attorney, Agent, or Firm* — Valerie M. Davis; Frank D. Cimino

(57) ABSTRACT

An example apparatus includes: a pullup circuit coupled to a first USB terminal; a first pulldown circuit coupled to the first USB terminal; a second pulldown circuit coupled to a second USB terminal; a third pulldown circuit coupled to a third USB terminal; a fourth pulldown circuit coupled to a fourth USB terminal; a high-speed termination detection circuit including: a current source including a first supply terminal and a second supply terminal, the first supply terminal coupled to the first USB terminal, the second supply terminal coupled to the second USB terminal; a first comparator including a first comparator terminal and a second comparator terminal, the first comparator terminal coupled to the first USB terminal; and a second comparator including a third comparator terminal and a fourth comparator terminal, the third comparator terminal coupled to the second USB terminal; and a controller including a first control terminal and a second control terminal, the first control terminal coupled to the second comparator terminal, the second control terminal coupled to the fourth comparator terminal.

10 Claims, 7 Drawing Sheets

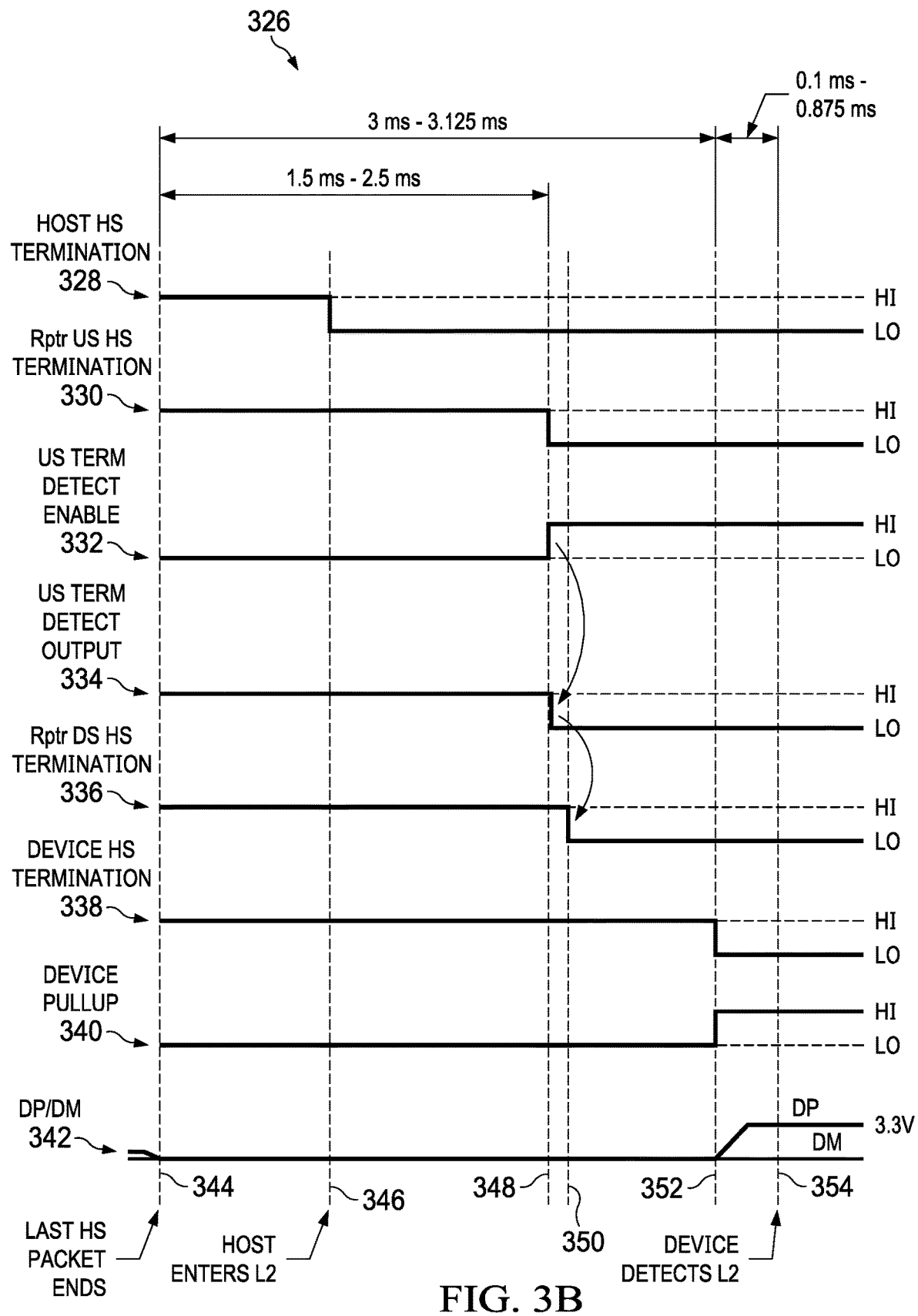

METHODS AND APPARATUS TO DETECT L2 ENTRY AND RESET IN UNIVERSAL SERIAL BUS REPEATERS

TECHNICAL FIELD

This description relates generally to universal serial bus (USB) signaling, and more particularly to methods and apparatus to detect L2 entry and reset in universal serial bus repeaters.

BACKGROUND

Universal serial bus (USB) communication is configured to communicate serial data at different transmission speeds. USB communication occurs across a differential data BUS between a primary device and a secondary device. USB enabled devices may alter the speed of a data transmission based on a communication mode. USB devices may be capable of low-speed mode, high-speed (HS) mode, and/or full speed (FS) mode. A USB device capable of high-speed mode includes circuitry configured to pulldown the differential data BUS. Typical USB enabled devices begin operation in full speed mode. The USB communication may enter high-speed mode by having both the primary device and secondary device configured to pulldown the differential data BUS. The primary device may indicate to the secondary device a return to full speed mode by disabling the circuitry configured to pulldown the differential data BUS. The secondary device is configured to determine whether or not the primary device has indicated a return to full speed mode as a result of the secondary device disabling the circuitry configured to pulldown the differential data BUS and enabling circuitry configured to pullup the differential data BUS. In such an example, a return to full speed mode is indicated by a voltage on the differential data BUS being approximately equal to a supply voltage.

SUMMARY

For methods and apparatus to detect L2 entry and reset in universal serial bus repeaters, an example apparatus includes a pullup circuit coupled to a first USB terminal; a first pulldown circuit coupled to the first USB terminal; a second pulldown circuit coupled to a second USB terminal; a third pulldown circuit coupled to a third USB terminal; a fourth pulldown circuit coupled to a fourth USB terminal; a high-speed termination detection circuit including: a current source including a first supply terminal and a second supply terminal, the first supply terminal coupled to the first USB terminal, the second supply terminal coupled to the second USB terminal; a first comparator including a first comparator terminal and a second comparator terminal, the first comparator terminal coupled to the first USB terminal; and a second comparator including a third comparator terminal and a fourth comparator terminal, the third comparator terminal coupled to the second USB terminal; and a controller including a first control terminal and a second control terminal, the first control terminal coupled to the second comparator terminal, the second control terminal coupled to the fourth comparator terminal.

BRIEF DESCRIPTION OF THE DRAWINGS

FIG. 3B is a second timing diagram of an example operation to detect a suspend state using the USB repeater circuitry of FIG. 1 including the high-speed termination detection circuitry of FIGS. 1 and 2.

The same reference numbers or other reference designators are used in the drawings to designate the same or similar (functionally and/or structurally) features.

DETAILED DESCRIPTION

Figure 1:
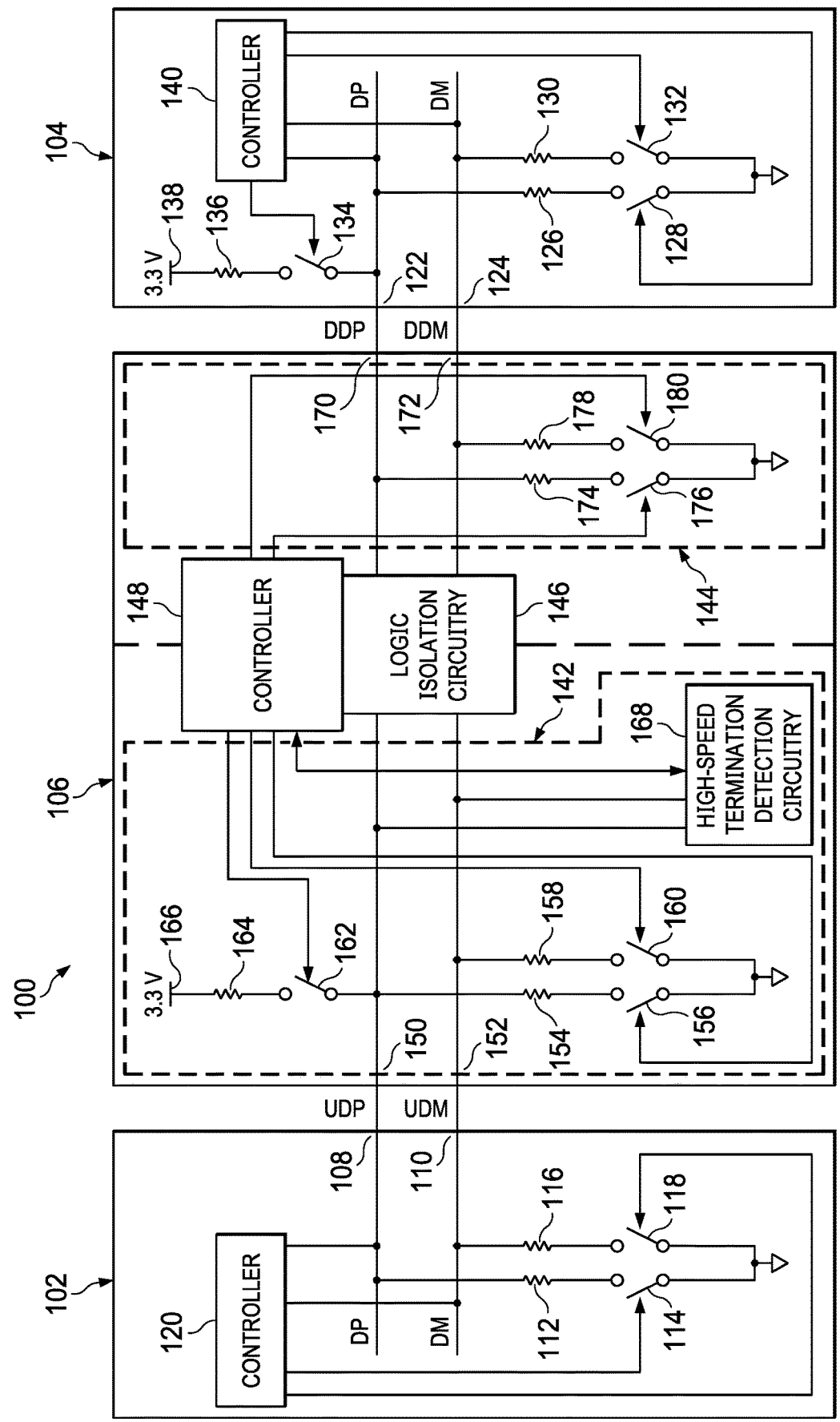
FIG. 1 is a schematic diagram of an example USB communication system including an example primary device, an example secondary device, and example USB repeater circuitry (including example high-speed termination detection circuitry to determine the mode of the primary device).

The drawings are not necessarily to scale.

Universal serial bus (USB) communication is configured to communicate serial data between a primary USB device and a secondary USB device across a differential data BUS using a USB communication protocol. The speed of the USB transmission is determined based on an operation mode, such that each operation mode corresponds to a different transmission speed. A USB device may include circuitry capable of low-speed (LS) mode, full speed (FS) mode, and/or high-speed (HS) mode. In some example applications, the USB device may transition from one mode to another mode as a result of determining another USB device is capable of a different USB communication mode. For example, the primary device may transition from full speed mode to high-speed mode as a result of determining the secondary device is capable of high-speed mode.

Typically, USB devices are configured to begin USB communication operations in full speed mode. The USB device may enter a state (e.g., a reset state, a suspend state, etc.) to indicate a transition to a different operation mode as a result of the primary device determining that the secondary device includes circuitry to support a different operation mode. For example, the primary device can enter a reset state, wherein the primary device enables circuitry to pulldown the differential data BUS and/or by driving the differential data BUS to a logic low, to indicate to the secondary device that the primary device is capable of high-speed mode. In some such examples, the secondary device can determine whether or not the primary device has enabled circuitry to pulldown the differential BUS as a result of determining the voltage of the differential data BUS is approximately equal to a first chirp voltage after enabling circuitry to supply a test current to the differential data BUS.

The USB communication between the primary device and secondary device finishes the reset state and begins to operate in high-speed mode as a result of the primary device determining the differential data BUS is approximately equal to a second chirp voltage. Alternatively, the secondary device may determine that the voltage of the differential data BUS is approximately equal to a voltage supply to indicate that the primary device is not attempting to enter high-speed.

A USB repeater is an example USB device configured to be placed between a primary device and a secondary device without adversely affecting the speed or quality of the data transmission of the USB communication system. In some applications, USB repeaters are configured to replicate the operation of both the primary device and the secondary device, such that the USB repeater must be able to indicate the operation mode of the primary device to the secondary device. USB repeaters operable in LS mode, FS mode, and/or HS mode, are designed to determine the state of the primary device based on the differential data BUS. The USB repeater replicates the operation mode of the primary device by enabling or disabling circuitry to pulldown the differential data BUS coupled between the USB repeater and the secondary device before the secondary device enables circuitry to pullup the differential data BUS to determine the operation mode of the primary device.

A USB repeater can be configured to replicate the operation mode of the primary device by determining whether or not the primary device has enabled or disabled pulldown circuitry. The USB repeater replicates the state of the primary device pulldown circuitry before the secondary device attempts to determine the mode of the primary device. For example, the USB repeater can determine the difference between a high-speed reset and a full speed suspend state before the secondary device measures the differential data BUS for a chirp voltage. A USB repeater may determine and replicate the mode of the primary device by including a precision clock of an accuracy greater than what is required for USB repeaters. In such an example, the precision clock is configured to provide a precise time reference for the detection of a change of the operation mode by accurately detecting a duration that has passed without USB communication. For example, a secondary device, which is transitioning from high-speed to full speed, enables its pullup circuitry after 3 milliseconds (mS) wherein there is no USB communication, before measuring the voltage of the differential data BUS at 3.1 mS in order to determine the operation mode of the primary device. In such an example, the USB repeater would only have 3.1 mS to disable pulldown circuitry and enable pullup circuitry, which is coupled to the differential data BUS, to determine whether the primary device has pulldown circuitry enabled. A USB repeater determines whether to enable or disable the pulldown circuitry on the differential data BUS coupled to the primary device and the USB repeater based on the voltage of the differential data BUS.

A USB repeater example described herein includes example high-speed termination detection circuitry to determine whether or not a primary device has transitioned from one operation mode to another operation mode. The USB repeater may include a clock of a lower precision than what has been conventionally used in USB repeaters as a result of including the high-speed termination detection circuitry, such that the cost of the clock included in the USB repeater is reduced. The high-speed termination detector circuitry is configured to determine whether or not the primary device has pulldown circuitry enabled. The high-speed termination detection circuitry may determine the primary device has entered a reset state or a suspend state (L2), such that the reset state indicates the primary device is not transitioning operation modes while the suspend state indicates a transition from high-speed mode to full speed mode.

FIG. 1 is a schematic diagram of an example USB communication system 100 including an example primary device 102, an example secondary device 104, and an example USB repeater circuitry 106. In the example of FIG. 1, the USB communications system 100 is configured for USB communication between the primary device 102 and the secondary device 104 through the USB repeater circuitry 106, situated between the primary device 102 and the secondary device 104. The USB repeater circuitry 106 includes circuitry to determine an operation mode of the primary device 102 and circuitry to replicate the determined operation mode. Such circuitry enables the secondary device 104 to determine the operation mode of the primary device 102 based on the replicated circuitry, as if the primary device 102 and the secondary device 104 were coupled directly to the same differential data BUS.

In the example of FIG. 1, the primary device 102 includes an example first USB terminal (UDP) 108, a second USB terminal (UDM) 110, a first resistor 112, a first switch 114, a second resistor 116, a second switch 118, and a first controller 120. The primary device 102 is configured to operate in full-speed mode by opening the switches 114 and 118, such that the USB terminals 108 and 110 are not coupled to a common potential (e.g., ground). The primary device 102 is configured to operate in high-speed mode as a result of closing the switches 114 and 118, such that the USB terminals 108 and 110 are coupled to the common potential through the resistors 112 and 116.

The USB terminals 108 and 110 are configured to be coupled to the secondary device 104, such that the USB terminals 108 and 110 comprise a first differential data BUS of the USB communication system 100. The USB terminals 108 and 110 are coupled to the first controller 120, such that the first controller 120 may set and/or determine the value of the USB terminals 108 and 110. The USB terminals 108 and 110 are configured to represent the USB communications between the primary device 102 and the secondary device 104 as a differential signal. The differential signal represented by the USB terminals 108 and 110 is configured to represent a value as the difference in voltage between the first USB terminal 108 and the second USB terminal 110, such that a logic high is determined as a result of a voltage difference between the USB terminals 108 and 110 above a threshold value. For example, the logic high signal is a signal (e.g., a voltage, a current, etc.) representative of a digital one (e.g., a digital '1,' a logic '1,' or a digital high), such as a voltage of 2.2V, 3.3V, 5V, etc. In some examples, a logic low signal is a signal representative of a digital zero (e.g., a digital '0,' a logic '0,' or a digital low), such as a common potential or ground.

The first resistor 112 is coupled between the first USB terminal 108 and the first switch 114. The first resistor 112 is configured to pulldown the first USB terminal 108 as a result of the first switch 114 being closed. The first resistor 112 is configured to be of a resistance large enough to set the voltage of the first USB terminal 108 based on a current supplied to the first USB terminal 108 by the USB repeater circuitry 106. For example, the first USB terminal 108 represents a logic high as a result of the first resistor 112, having a resistance approximately equal to 45 ohms ($\Omega$), being supplied a current approximately equal to 40 milliamps (mA) to set the voltage of the first USB terminal 108 to 1.8 volts (V). The first resistor 112 is configured to pulldown the first USB terminal 108 as a result of the primary device operating in high-speed mode.

The first switch 114 is coupled between the first resistor 112 and the common potential. The first switch 114 is coupled to the first controller 120, such that the first controller 120 may open and/or close the first switch 114. The first switch 114 is configured to be closed to allow the first resistor 112 to pulldown the first USB terminal 108, such that the primary device 102 may operate in high-speed mode. The state of the first switch 114 determines the operation mode of the primary device 102 on the first USB terminal 108. For example, the primary device 102 operates in high-speed mode as a result of the switches 114 and 118 being closed by the first controller 120. Alternatively, the primary device 102 operates in full-speed mode as a result of the first switch 114 being opened by the first controller 120. In the example of FIG. 1, the first switch 114 is illustrated as a switch controlled by the first controller 120 through a control input. Alternatively, the first switch 114 may be a transistor controlled by the first controller 120.

The second resistor 116 is coupled between the second USB terminal 110 and the second switch 118. The second resistor 116 is configured to pulldown the second USB terminal 110 as a result of the second switch 118 being closed. The second resistor 116 is configured to be of a resistance large enough to set the voltage of the second USB terminal 110 based on a current supplied to the second USB terminal 110 by the USB repeater circuitry 106. For example, the second USB terminal 110 represents a logic high as a result of the second resistor 116, having a resistance approximately equal to 45 ohms ($\Omega$), being supplied a current approximately equal to 40 Milliamps (mA) to set the voltage of the second USB terminal 110 to 1.8 volts (V). The second resistor 116 is configured to pulldown the second USB terminal 110 as a result of the primary device operating in high-speed mode.

The second switch 118 is coupled between the second resistor 116 and the common potential. The second switch 118 is coupled to the first controller 120, such that the first controller 120 may open and/or close the second switch 118. The second switch 118 is configured to be closed to allow the second resistor 116 to pulldown the second USB terminal 110, such that the primary device 102 may operate in high-speed mode. The state of the switches 114 and 118 determine the operation mode of the primary device 102 on the second USB terminal 110. For example, the primary device 102 operates in high-speed mode as a result of the switches 114 and 118 being closed by the first controller 120. Alternatively, the primary device 102 operates in full-speed mode as a result of the second switch 118 being opened by the first controller 120. In the example of FIG. 1, the second switch 118 is illustrated as a switch controlled by the first controller 120 through a control input. Alternatively, the second switch 118 may be a transistor controlled by the first controller 120.

In the example of FIG. 1, the secondary device 104 includes a third USB terminal (DDP) 122, a fourth USB terminal (DDM) 124, a third resistor 126, a third switch 128, a fourth resistor 130, a fourth switch 132, a fifth switch 134, a fifth resistor 136, a first voltage supply 138, and a second controller 140. The secondary device 104 is configured to operate in full-speed mode as a result of opening the switches 128 and 132 and closing the fifth switch 134, such that the USB terminals 122 and 124 are coupled to a voltage supply. The secondary device 104 is configured to operate in high-speed mode as a result of closing the switches 128 and 132, such that the USB terminals 122 and 124 are coupled to the common potential through the resistors 126 and 130.

The USB terminals 122 and 124 are configured to be coupled to the primary device 102, such that the USB terminals 122 and 124 comprise a second differential data BUS of the USB communication system 100. The USB terminals 122 and 124 are coupled to the second controller 140, such that the second controller 140 may set and/or determine the value of the USB terminals 122 and 124. The USB terminals 122 and 124 are configured to represent the USB communications between the primary device 102 and the secondary device 104 as a differential signal. The differential signal represented by the USB terminals 122 and 124 are configured to represent a value as the difference in voltage between the third USB terminal 122 and the fourth USB terminal 124, such that a logic high is determined as a result of a voltage difference between the USB terminals 122 and 124 above a threshold value. For example, the logic high signal is a signal (e.g., a voltage, a current, etc.) representative of a digital one (e.g., a digital '1' or a logic '1'), such as a voltage of 2.2V, 3.3V, 5V, etc. In some examples, a logic low signal is a signal representative of a digital zero (e.g., a digital '0' or a logic '0'), such as a common potential. The common potential or ground for secondary device 104 may be the same or different than the common potential or ground for the primary device. The difference is potentials for the primary device 102 and the secondary device 104 may be due to the isolation circuitry 146 in the USB repeater circuitry 106.

The third resistor 126 is coupled between the third USB terminal 122 and the third switch 128. The third resistor 126 is configured to pulldown the third USB terminal 122 as a result of the third switch 128 being closed. The third resistor 126 is configured to be of a resistance large enough to set the voltage of the third USB terminal 122 based on a current supplied to the third USB terminal 122 by the USB repeater circuitry 106. For example, the third USB terminal 122 represents a high-speed mode as a result of determining the voltage of the third USB terminal 122 is approximately equal to 400 millivolts (mV) after the third resistor 126, having a resistance approximately equal to 45 ohms ($\Omega$), is supplied current prior to the secondary device 104 supplying a test current to the third USB terminal 122. In such an example, the third USB terminal 122 is approximately equal to 400 mV in response to the test current having a magnitude of 17.78 milliamps (mA), which indicates that the third resistor 126 is coupled in parallel with another resistor of approximately the same magnitude. The third resistor 126 is configured to pulldown the third USB terminal 122 as a result of the primary device 102 operating in high-speed mode and/or high-speed reset.

The third switch 128 is coupled between the third resistor 126 and the common potential. The third switch 128 is coupled to the second controller 140, such that the second controller 140 may open and/or close the third switch 128. The third switch 128 is configured to allow the third resistor 126 to pulldown the third USB terminal 122, such that the primary device 102 may operate in high-speed mode. The state of the switches 128, 132, and 134 determine the operation mode of the primary device 102 on the third USB terminal 122. For example, the primary device 102 operates in high-speed mode as a result of the switches 128 and 132 being closed by the second controller 140. Alternatively, the primary device 102 operates in full-speed mode as a result of the third switch 128 being opened by the second controller 140. In the example of FIG. 1, the third switch 128 is illustrated as a switch controlled by the second controller 140 through a control input. Alternatively, the third switch 128 may be a transistor controlled by the second controller 140.

The fourth resistor 130 is coupled between the fourth USB terminal 124 and the fourth switch 132. The fourth resistor 130 is configured to pulldown the fourth USB terminal 124 as a result of the fourth switch 132 being closed. The fourth resistor 130 is configured to be of a resistance large enough to set the voltage of the fourth USB terminal 124 based on a current supplied to the fourth USB terminal 124 by the USB repeater circuitry 106. For example, the fourth USB terminal 124 represents a high-speed mode as a result of determining the voltage of the fourth USB terminal 124 is approximately equal to 400 millivolts (mV) after the fourth resistor 130, having a resistance approximately equal to 45 ohms (Ω), is supplied a current prior to the secondary device 104 supplying a test current to the fourth USB terminal 124. In such an example, the fourth USB terminal 124 is approximately equal to 400 mV in response to the test current having a magnitude of 17.78 milliamps (mA), which indicates that the fourth resistor 130 is coupled in parallel with another resistor of approximately the same magnitude. The fourth resistor 130 is configured to pulldown the fourth USB terminal 124 as a result of the secondary device 104 operating in high-speed mode and/or high-speed reset.

The fourth switch 132 is coupled between the fourth resistor 130 and the common potential. The fourth switch 132 is coupled to the second controller 140, such that the second controller 140 may open and/or close the fourth switch 132. The fourth switch 132 is configured to allow the fourth resistor 130 to pulldown the fourth USB terminal 124, such that the secondary device 104 may operate in high-speed mode. The state of the switches 128, 132, and 134 determine the operation mode of the secondary device 104 on the fourth USB terminal 124. For example, the secondary device 104 operates in high-speed mode as a result of the switches 128 and 132 being closed by the second controller 140. Alternatively, the secondary device 104 operates in full-speed mode as a result of the fourth switch 132 being opened by the second controller 140. In the example of FIG. 1, the fourth switch 132 is illustrated as a switch controlled by the second controller 140 through a control input. Alternatively, the fourth switch 132 may be a transistor controlled by the second controller 140.

The fifth switch 134 is coupled between the third USB terminal 122 and the fifth resistor 136. The fifth switch 134 is coupled to the second controller 140, such that the second controller 140 may open and/or close the fifth switch 134. The fifth switch 134 is configured to allow the fifth resistor 136 to pullup the third USB terminal 122, such that the secondary device 104 may operate in full-speed mode or determine whether or not the USB terminals 122 and 124 are being pulled down. The state of the switches 128, 132, and 134 determine the operation mode of the secondary device 104 on the third USB terminal 122. For example, the secondary device 104 operates in full-speed mode as a result of the fifth switch 134 being closed by the second controller 140. Alternatively, the secondary device 104 operates in high-speed mode as a result of the fifth switch 134 being opened and the switches 128 and 132 being closed by the second controller 140. In the example of FIG. 1, the fifth switch 134 is illustrated as a switch controlled by the second controller 140 through a control input. Alternatively, the fifth switch 134 may be a transistor controlled by the second controller 140.

The fifth resistor 136 is coupled between the fifth switch 134 and the first voltage supply 138 (which is shown to be approximately 3.3 volts in FIG. 1 but may any voltage that can be used in USB applications). The fifth resistor 136 is configured to pullup the third USB terminal 122 as a result of the fifth switch 134 being closed. The fifth resistor 136 is configured to be of a resistance large enough to set the voltage of the third USB terminal 122 to a value approximately equal to a chirp voltage as a result of the first resistor 112 pulling down the first USB terminal 108 and the fifth resistor 136 pulling up the third USB terminal 122. For example, the third USB terminal 122 is approximately equal to common potential as a result of the first resistor 112 being equal to 45 ohms (Ω) and the fifth resistor 136 being equal to 1.5 kilohms (kΩ). The fifth resistor 136 is configured to pullup the third USB terminal 122 as a result of the secondary device 104 operating in full-speed mode or determining whether or not the USB terminals 122 and 124 are being pulled down.

In the example of FIG. 1, the USB repeater circuitry 106 includes upstream circuitry 142, downstream circuitry 144, logic isolation circuitry 146, and a third controller 148. The USB repeater circuitry 106 is coupled between the primary device 102 and the secondary device 104, such that all USB communications pass through the USB repeater circuitry 106. The logic isolation circuitry 146 (e.g., any type of galvanic isolation, inductive isolation and/or capacitive isolation) is coupled between the upstream circuitry 142 and the downstream circuitry 144. Due to the isolation circuitry 146, the upstream circuitry 142 and downstream circuitry 144 may operate at different voltages and/or different common potentials. The USB repeater circuitry 106 is configured to replicate the operation of the secondary device 104 using the upstream circuitry 142 and the third controller 148. The upstream circuitry 142 is configured to determine the operation mode of the primary device 102, such that the operation mode may be replicated using the downstream circuitry 144. The USB repeater circuitry 106 is configured to replicate the operation of the primary device 102 using the downstream circuitry 144 and the third controller 148. The logic isolation circuitry 146 is configured to buffer the transmissions of the upstream circuitry 142 and the downstream circuitry 144, such that the primary device 102 and the secondary device 104 may communicate as if the devices 102 and 104 were directly coupled. Transmissions across isolation circuitry 146 may need to be converted (such as, modulated) to transverse the isolation barrier and then de-converted (such as, demodulated and converted back to digital).

The upstream circuitry 142 includes a fifth USB terminal (UDP) 150, a sixth USB terminal (UDM) 152, a sixth resistor 154, a sixth switch 156, a seventh resistor 158, a seventh switch 160, an eighth switch 162, an eighth resistor 164, a second voltage supply 166, and an example high-speed termination detection circuitry 168. The upstream circuitry 142 is coupled between the primary device 102 and the logic isolation circuitry 146. The upstream circuitry 142 includes circuitry to replicate the full-speed mode and high-speed mode of the secondary device 104.

The USB terminals 150 and 152 are configured to be coupled to USB terminals 108 and 110, such that the USB terminals 108, 110, 150, and 152 comprise the first differential data BUS of the USB communication system 100. The USB terminals 150 and 152 are configured to represent USB communications between the primary device 102 and the secondary device 104 as a differential signal. The differential signal represented by the USB terminals 150 and 152 is configured to represent a value as the difference in voltage between the fifth USB terminal 150 and the sixth USB terminal 152, such that a logic high is determined as a result of a voltage difference between the USB terminals 150 and 152 above a threshold value.

The sixth resistor 154 is coupled between the fifth USB terminal 150 and the sixth switch 156. The sixth resistor 154 is configured to pulldown the fifth USB terminal 150 as a result of the sixth switch 156 being closed. The sixth resistor 154 is configured to be of a resistance large enough to set the voltage of the fifth USB terminal 150 based on a current supplied to the fifth USB terminal 150 by the USB repeater circuitry 106. For example, the fifth USB terminal 150 represents a high-speed mode as a result of determining the voltage of the fifth USB terminal 150 is approximately equal to 400 millivolts (mV) after the sixth resistor 154, having a resistance approximately equal to 45 ohms (Ω), is supplied current prior to the primary device 102 supplying a test current to the first USB terminal 108. In such an example, the fifth USB terminal 150 is approximately equal to 400 mV in response to the test current having a magnitude of 17.78 milliamps (mA), which indicates that the sixth resistor 154 is coupled in parallel with another resistor of approximately the same magnitude. The sixth resistor 154 is configured to pulldown the fifth USB terminal 150 as a result of the USB communication system 100 operating in high-speed mode and/or high-speed reset.

The sixth switch 156 is coupled between the sixth resistor 154 and the common potential. The sixth switch 156 is coupled to the third controller 148, such that the third controller 148 may open and/or close the sixth switch 156. The sixth switch 156 is configured to allow the sixth resistor 154 to pulldown the fifth USB terminal 150, such that the USB communication system 100 may operate in high-speed mode. The state of the sixth switch 156 represents the operation mode of the secondary device 104 on the fifth USB terminal 150. For example, the sixth switch 156 is closed by the third controller 148 as a result of determining the USB communication system 100 is operating in high-speed mode. Alternatively, the sixth switch 156 may be opened as a result of determining the USB communication system 100 is operating in full-speed mode. In the example of FIG. 1, the sixth switch 156 is illustrated as a switch controlled by the third controller 148 through a control input. Alternatively, the sixth switch 156 may be a transistor controlled by the third controller 148.

The seventh resistor 158 is coupled between the sixth USB terminal 152 and the seventh switch 160. The seventh resistor 158 is configured to pulldown the sixth USB terminal 152 as a result of the seventh switch 160 being closed. The seventh resistor 158 is configured to be of a resistance large enough to set the voltage of the sixth USB terminal 152 based on a current supplied to the sixth USB terminal 152 by the USB repeater circuitry 106. For example, the sixth USB terminal 152 represents a high-speed mode as a result of determining the voltage of the sixth USB terminal 152 is approximately equal to 400 millivolts (mV) after the seventh resistor 158, having a resistance approximately equal to 45 ohms (Ω), is supplied current prior to the primary device 102 supplying a test current to the second USB terminal 110. In such an example, the sixth USB terminal 152 is approximately equal to 400 mV in response to the test current having a magnitude of 17.78 milliamps (mA), which indicates that the seventh resistor 158 is coupled in parallel with another resistor of approximately the same magnitude. The seventh resistor 158 is configured to pulldown the sixth USB terminal 152 as a result of the USB communication system 100 operating in high-speed mode and/or high-speed reset.

The seventh switch 160 is coupled between the seventh resistor 158 and the common potential. The seventh switch 160 is coupled to the third controller 148, such that the third controller 148 may open and/or close the seventh switch 160. The seventh switch 160 is configured to allow the seventh resistor 158 to pulldown the sixth USB terminal 152, such that the USB communication system 100 may operate in high-speed mode. The state of the seventh switch 160 represents the operation mode of the secondary device 104 on the sixth USB terminal 152. For example, the seventh switch 160 is closed by the third controller 148 as a result of determining the USB communication system 100 is operating in high-speed mode. Alternatively, the seventh switch 160 may be opened as a result of determining the USB communication system 100 is operating in full-speed mode. In the example of FIG. 1, the seventh switch 160 is illustrated as a switch controlled by the third controller 148 through a control input. Alternatively, the seventh switch 160 may be a transistor controlled by the third controller 148.

The eighth switch 162 is coupled between the fifth USB terminal 150 and the eighth resistor 164. The eighth switch 162 is coupled to the third controller 148, such that the third controller 148 may open and/or close the eighth switch 162. The eighth switch 162 is configured to allow the eighth resistor 164 to pullup the fifth USB terminal 150, such that the USB repeater circuitry 106 may replicate the secondary device 104 operations in full-speed mode and determine whether or not the USB terminals 150 and 152 are being pulled down. The state of the eighth switch 162 represents the operation mode of the secondary device 104 on the fifth USB terminal 150. For example, the eighth switch 162 is closed by the third controller 148 as a result of the USB repeater circuitry 106 determining the secondary device 104 is operating in full-speed mode. Alternatively, the USB repeater circuitry 106 may replicate the secondary device 104 operating in high-speed mode as a result of the eighth switch 162 being opened by the third controller 148. In the example of FIG. 1, the eighth switch 162 is illustrated as a switch controlled by the third controller 148 through a control input. Alternatively, the eighth switch 162 may be a transistor controlled by the third controller 148.

The eighth resistor 164 is coupled between the eighth switch 162 and the second voltage supply 166. The eighth resistor 164 is configured to pullup the fifth USB terminal 150 as a result of the eighth switch 162 being closed. The eighth resistor 164 is configured to be of a resistance large enough to set the voltage of the fifth USB terminal 150 to a value approximately equal to the common potential as a result of the first resistor 112 pulling down the first USB terminal 108 and the eighth resistor 164 pulling up the sixth USB terminal 152. For example, the fifth USB terminal 150 is approximately equal to common potential as a result of the first resistor 112 being equal to 45 ohms (Ω) and the eighth resistor 164 being equal to 1.5 kilohms (kΩ). The eighth resistor 164 is configured to pullup the fifth USB terminal 150 as a result of the USB repeater circuitry 106 determining the secondary device 104 is operating in full-speed mode or in the process of determining whether or not the USB terminals 150 and 152 are being pulled down.

The high-speed termination detection circuitry 168 is coupled to the third controller 148 and the USB terminals 150 and 152. The high-speed termination detection circuitry 168 is configured to determine the operation mode of the primary device 102. For example, the high-speed termination detection circuitry 168 may supply a current to the USB terminals 150 and 152 to determine whether the voltage is representative of the switches 114 and 118 being opened or closed. The high-speed termination detection circuitry 168 is configured to indicate to the third controller 148 the operation mode of the primary device 102 as a result of determining the operation mode of the primary device 102. For example, the high-speed termination detection circuitry 168 may assert a pin coupled between the third controller 148 and the high-speed termination detection circuitry 168 to indicate high-speed mode. The high-speed termination detection circuitry 168 is additionally illustrated by FIG. 2.

In the example of FIG. 1, the high-speed termination detection circuitry 168 is coupled individually to the USB terminals 150 and 152, such that the high-speed termination detection circuitry 168 may interact with each terminal individually. Additionally, the high-speed termination detection circuitry 168 is coupled to the third controller 148 (there may be more connections between the high-speed termination detection circuitry 168 and the third controller 148 than depicted by FIG. 1). The high-speed termination detection circuitry 168 is configured to be controlled by the third controller 148, such that different circuitry included in the high-speed termination detection circuitry 168 may be individually enabled and/or disabled. The high-speed termination detection circuitry 168 is configured to supply power to the USB terminals 150 and 152 to determine whether or not the USB terminals 150 and 152 are coupled to a device which is pulling down the USB terminals 150 and 152. For example, the high-speed termination detection circuitry 168 may supply a current to USB terminals 150 and 152 before monitoring for a change in voltage of the USB terminals 150 and 152. In such an example, the voltage of the USB terminals 150 and 152 would increase as a result of circuitry, configured to pulldown the USB terminals 150 and 152, being coupled to the USB terminals 150 and 152. Advantageously, the magnitude of power supplied to the USB terminals 150 and 152 may be increased to reduce settling times of components coupled to the USB terminals 150 and 152, such that the time to determine the operation mode of the primary device 102 is decreased. Advantageously, the high-speed termination detection circuitry 168 is configured to implement circuitry to determine the mode of the primary device 102, such that no analog to digital conversion is required to determine the voltage of the USB terminals 150 and 152.

The downstream circuitry 144 includes a seventh USB terminal (DDP) 170, an eighth USB terminal (DDM) 172, a ninth resistor 174, a ninth switch 176, a tenth resistor 178, and a tenth switch 180. The downstream circuitry 144 is coupled between the secondary device 104 and the logic isolation circuitry 146. The downstream circuitry 144 includes circuitry to replicate the full-speed mode and high-speed operation mode of the primary device 102.

The USB terminals 170 and 172 are configured to be coupled to USB terminals 122 and 124, such that the USB terminals 122, 124, 170, and 172 (and the conductors connected therebetween) comprise the second differential data BUS of the USB communication system 100. The USB terminals 170 and 172 are configured to represent the USB communications between the primary device 102 and the secondary device 104 as a differential signal. The differential signal represented by the USB terminals 170 and 172 are configured to represent a value as the difference in voltage between the seventh USB terminal 170 and the eighth USB terminal 172, such that a logic high is determined as a result of a voltage difference between the USB terminals 170 and 172 above a threshold value.

The ninth resistor 174 is coupled between the seventh USB terminal 170 and the ninth switch 176. The ninth resistor 174 is configured to pulldown the seventh USB terminal 170 as a result of the ninth switch 176 being closed. The ninth resistor 174 is configured to be of a resistance large enough to set the voltage of the seventh USB terminal 170 based on a current supplied to the seventh USB terminal 170 by the USB repeater circuitry 106. For example, the seventh USB terminal 170 represents a high-speed mode as a result of determining the voltage of the seventh USB terminal 170 is approximately equal to 400 millivolts (mV) after the ninth resistor 174, having a resistance approximately equal to 45 ohms ($\Omega$), is supplied current prior to the secondary device 104 supplying a test current to the third USB terminal 122. In such an example, the seventh USB terminal 170 is approximately equal to 400 mV in response to the test current having a magnitude of 17.78 milliamps (mA), which indicates that the ninth resistor 174 is coupled in parallel with another resistor of approximately the same magnitude. The ninth resistor 174 is configured to pulldown the seventh USB terminal 170 as a result of the USB communication system 100 operating in high-speed mode and/or high-speed reset.

The ninth switch 176 is coupled between the ninth resistor 174 and the common potential. The ninth switch 176 is coupled to the third controller 148, such that the third controller 148 may open and/or close the ninth switch 176. The ninth switch 176 is configured to allow the ninth resistor 174 to pulldown the seventh USB terminal 170, such that the USB communication system 100 may operate in high-speed mode. The state of the ninth switch 176 represents the operation mode of the secondary device 104 on the seventh USB terminal 170. For example, the ninth switch 176 is closed by the third controller 148 as a result of determining the USB communication system 100 is operating in high-speed mode. Alternatively, the ninth switch 176 may be opened as a result of determining the USB communication system 100 is operating in full-speed mode. In the example of FIG. 1, the ninth switch 176 is illustrated as a switch controlled by the third controller 148 through a control input. Alternatively, the ninth switch 176 may be a transistor controlled by the third controller 148.

The tenth resistor 178 is coupled between the eighth USB terminal 172 and the tenth switch 180. The tenth resistor 178 is configured to pulldown the eighth USB terminal 172 as a result of the tenth switch 180 being closed. The tenth resistor 178 is configured to be of a resistance large enough to set the voltage of the eighth USB terminal 172 based on a current supplied to the eighth USB terminal 172 by the USB repeater circuitry 106. For example, the eighth USB terminal 172 represents a high-speed mode as a result of determining the voltage of the eighth USB terminal 172 is approximately equal to 400 millivolts (mV) after the tenth resistor 178, having a resistance approximately equal to 45 ohms ($\Omega$), is supplied current prior to the secondary device 104 supplying a test current to the third USB terminal 122. In such an example, the eighth USB terminal 172 is approximately equal to 400 mV in response to the test current having a magnitude of 17.78 milliamps (mA), which indicates that the tenth resistor 178 is coupled in parallel with another resistor of approximately the same magnitude. The tenth resistor 178 is configured to pulldown the eighth USB terminal 172 as a result of the USB communication system 100 operating in high-speed mode and/or high-speed reset.

The tenth switch 180 is coupled between the tenth resistor 178 and the common potential. The tenth switch 180 is coupled to the third controller 148, such that the third controller 148 may open and/or close the tenth switch 180. The tenth switch 180 is configured to allow the tenth resistor 178 to pulldown the eighth USB terminal 172, such that the USB communication system 100 may operate in high-speed mode. The state of the tenth switch 180 represents the operation mode of the secondary device 104 on the eighth USB terminal 172. For example, the tenth switch 180 is closed by the third controller 148 as a result of determining the USB communication system 100 is operating in high-speed mode. Alternatively, the tenth switch 180 may be opened as a result of determining the USB communication system 100 is operating in full-speed mode. In the example of FIG. 1, the tenth switch 180 is illustrated as a switch controlled by the third controller 148 through a control input. Alternatively, the tenth switch 180 may be a transistor controlled by the third controller 148.

In example operation, the primary device 102 is configured to begin USB communication in full speed mode, such that the first controller 120 is configured to open the switches 114 and 118. The USB repeater circuitry 106 is configured to open the switches 176 and 180 to replicate the full speed mode of the primary device 102. The secondary device 104 is configured to begin USB communication in full speed mode, such that the second controller 140 is configured to open the switches 128 and 132 before closing the fifth switch 134. The USB repeater circuitry 106 is configured to open the switches 156 and 160 before closing the eighth switch 162 to replicate the full speed operation mode of the secondary device 104.

In example operation, the primary device 102 is configured to determine if the secondary device 104 is capable of high-speed mode by entering a reset state and closing the switches 114 and 118, such that the USB terminals 108, 110, 150, and 152 are pulled towards common potential and/or by enabling the first controller 120 to drive the USB terminals 108 and 110 to a logic low. The USB repeater circuitry 106 may determine that the primary device 102 has pulled down the USB terminals 108 and 110 using the high-speed termination detection circuitry 168 to determine the voltage of the USB terminals 150 and 152. The USB repeater circuitry 106 is configured to close the switches 176 and 180 and/or configure the logic isolation circuitry 146 to drive the USB terminals 170 and 172 to a logic low to replicate the primary device 102, such that the secondary device 104 may determine the operation mode of the primary device 102. The secondary device 104 is configured to open the fifth switch 134 before closing the switches 128 and 132 and configuring the second controller 140 to supply a test current to the USB terminals 150 and 152. The secondary device 104 determines the operation mode of the primary device 102 based on the second controller 140 determining that the voltage of the USB terminals 122 and 124 are approximately equal to a chirp voltage as a result of being pulled down and/or driven low. The primary device 102 is configured to wait for a logic low on the USB terminals 108 and 110 before supplying the test current to determine whether the secondary device 104 enabled circuitry for high-speed mode. The USB communication system 100 is configured to begin USB communications, by having the primary device 102 communicate to the secondary device 104 through the USB repeater circuitry 106, upon finishing a reset state, which configures the operation mode of the primary device 102 and the secondary device 104.

In example operation, the primary device 102 is configured to leave high-speed mode and return to full-speed mode as a result of the first controller 120 disabling the switches 114 and 118 following preventing USB communications for a set duration. The logic isolation circuitry 146 is configured to determine whether or not a USB communication has occurred within the set duration. The USB repeater circuitry 106 is configured to determine whether the USB terminals 150 and 152 are being pulled down by opening the switches 156 and 160 before enabling the high-speed termination detection circuitry 168. The high-speed termination detection circuitry 168 is configured to indicate to the third controller 148 whether or not the primary device 102 opened the switches 114 and 118. The third controller 148 is configured to open the switches 176 and 180 as a result of the high-speed termination detection circuitry 168 indicating the USB terminals 150 and 152 are no longer being pulled down. The secondary device 104 is configured to determine whether or not the USB terminals 122 and 124 are being pulled down by opening the switches 128 and 132 before closing the fifth switch 134 and determining the voltage of the USB terminals 122 and 124. The primary device 102 may indicate an entry into a suspend state by opening the switches 114 and 118. Alternatively, the primary device 102 may indicate entry into a reset state by having the switches 114 and 118 remain closed during the set duration wherein no USB communication occurs. Advantageously, the USB repeater circuitry 106 is configured to determine whether the primary device 102 has entered the suspend state or the reset state using the high-speed termination detection circuitry 168. Advantageously, the USB repeater circuitry 106 requires a clock of a precision equivalent to the set duration in order for the high-speed termination detection circuitry 168 to determine the state of the primary device 102 in time to replicate the primary device 102 state in the downstream circuitry 144.

Figure 2:
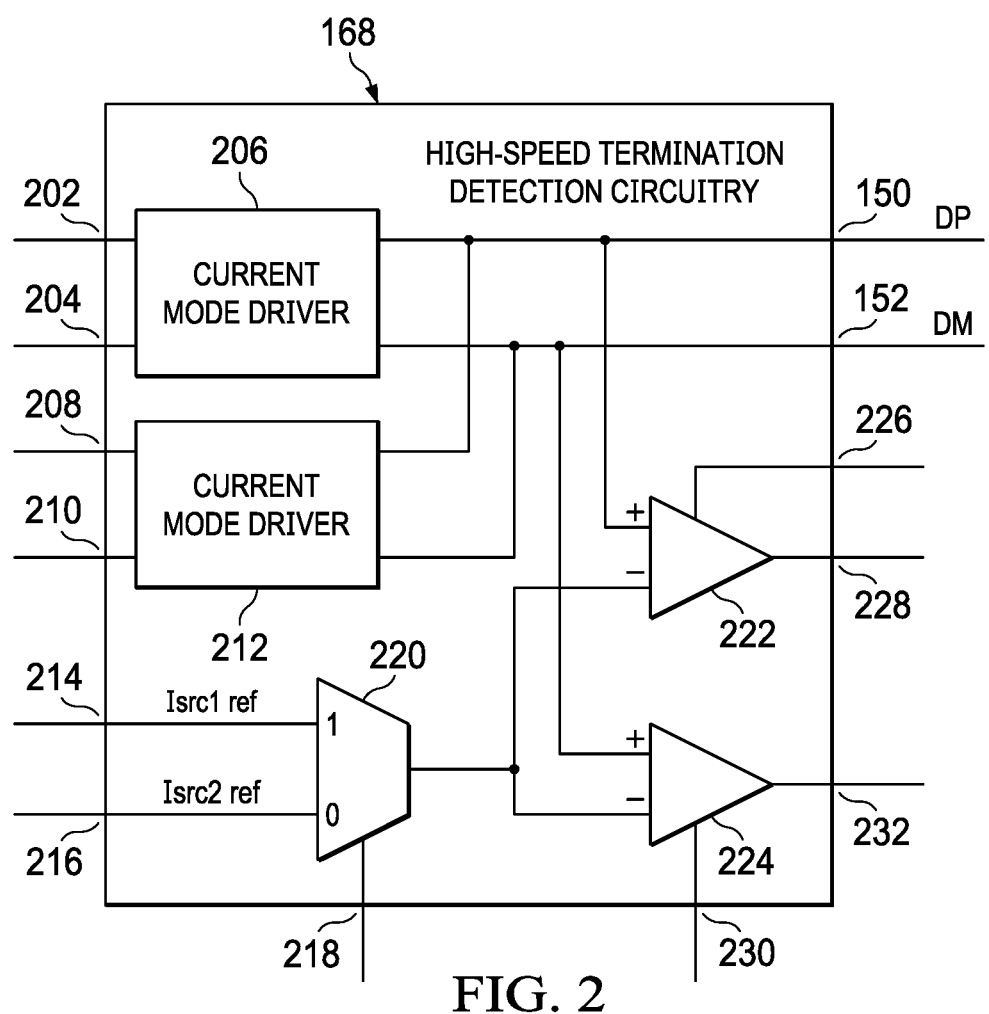
FIG. 2 is a schematic diagram of an example of the high-speed termination detection circuitry of FIG. 1.

FIG. 2 is a schematic diagram of an example of the high-speed termination detection circuitry 168 of FIG. 1. In the example of FIG. 2, the high-speed termination detection circuitry 168 includes the fifth USB terminal 150, the sixth USB terminal 152, a first source control terminal 202, a second source control terminal 204, a first current mode driver 206, a third source control terminal 208, a fourth source control terminal 210, a second current mode driver 212, a first reference input terminal 214, a second reference input terminal 216, a reference control terminal 218, a multiplexer 220, a first comparator 222, a second comparator 224, a first supply terminal 226, a first termination indication terminal 228, a second supply terminal 230, and a second termination indication terminal 232. In the example of FIG. 2, the high-speed termination detection circuitry 168 is configured to assert (e.g., bring to a logic "1" or a logic "high") the termination indication terminals 228 and 232 based on the operation mode of the primary device 102 of FIG. 1.

In the example of FIG. 2, the source control terminals 202 and 204 are coupled to the first current mode driver 206. The source control terminals 202 and 204 are configured to enable and/or disable an output of the first current mode driver 206. For example, the first source control terminal 202 is configured to enable the first current mode driver 206 to supply a current to the fifth USB terminal 150 whereas the second source control terminal 204 is configured to enable the first current mode driver 206 to supply a current to the sixth USB terminal 152. The source control terminals 202 and 204 may be coupled to the third controller 148 of FIG. 1, such that the first current mode driver 206 may be enabled by the third controller 148.

The first current mode driver 206 is configured to receive an input on the source control terminals 202 and 204 and to output to the USB terminals 150 and 152. The first current mode driver 206 is configured to supply a current and/or voltage of a first magnitude to the fifth USB terminal 150 as a result of the first source control terminal 202 being set to a logic high or a voltage above a threshold based on the properties of the first current mode driver 206. Additionally, the first current mode driver 206 is configured to supply a current and/or voltage to the sixth USB terminal 152 as a result of the second source control terminal 204 being set to a logic high or a voltage above the threshold. Advantageously, the first current mode driver 206 may be enabled to supply a current to the USB terminals 150 and 152 to determine if the USB terminals 150 and 152 are coupled to enabled pulldown circuitry (e.g., the resistors 112 and 116 coupled to the switches 114 and 118). The first current mode driver 206 may be referred to as a current supply.

The source control terminals 208 and 210 are coupled to the second current mode driver 212. The source control terminals 208 and 210 are configured to enable and/or disable an output of the second current mode driver 212. For example, the third source control terminal 208 is configured to enable the second current mode driver 212 to supply a current to the fifth USB terminal 150 whereas the fourth source control terminal 210 is configured to enable the second current mode driver 212 to supply a current to the sixth USB terminal 152. The source control terminals 208 and 210 may be coupled to the third controller 148, such that the second current mode driver 212 may be enabled by the third controller 148.

The second current mode driver 212 is configured to receive an input on the source control terminals 208 and 210 and to output to the USB terminals 150 and 152. The second current mode driver 212 is configured to supply a current and/or voltage of a second magnitude to the fifth USB terminal 150 as a result of the third source control terminal 208 being set to a logic high or a voltage above a threshold based on the properties of the second current driver mode 212. Additionally, the second current mode driver 212 is configured to supply a current and/or voltage to the sixth USB terminal 152 as a result of the fourth source control terminal 210 being set to a logic high or a voltage above the threshold. Alternatively, the high-speed termination detection circuitry 168 may include either of the current mode drivers 206 or 212. Advantageously, the second current mode driver 212 may be enabled to supply a current to the USB terminals 150 and 152 to determine whether or not the USB terminals 150 and 152 are coupled to pulldown circuitry (e.g., the resistors 112 and 116 of FIG. 1 coupled to the switches 114 and 118 of FIG. 1). The second current mode driver 212 may be referred to as a current supply.

The reference input terminals 214 and 216 are coupled to the multiplexer 220. The reference input terminals 214 and 216 may be configured to be coupled to the third controller 148. The reference input terminals 214 and 216 are configured to supply a reference current to the multiplexer 220. The first reference input terminal 214 is configured to supply a first current (Isrc1 ref) to the multiplexer 220. The first current is configured to be of a magnitude approximately equal to the current of the first magnitude, which may be supplied by the first current mode driver 206 to the USB terminals 150 and 152. The second reference input terminal 216 is configured to supply a second current (Isrc2 ref) to the multiplexer 220. The second current is configured to be of a magnitude approximately equal to the current of the second magnitude, which may be supplied by the second current mode driver 212 to the USB terminals 150 and 152.

The reference control terminal 218 is coupled to the multiplexer 220. The reference control terminal 218 may be configured to be coupled to the third controller 148. The reference control terminal 218 is configured to control the multiplexer 220. For example, the multiplexer 220 outputs a current approximately (preferably exactly) equal to the current supplied to the first reference input terminal 214 as a result of the reference control terminal 218 being set to a logic high. In such an example, the multiplexer 220 outputs a current approximately (preferably exactly) equal to current supplied to the second reference input terminal 216 as a result of the reference control terminal 218 being set to a digital zero. Advantageously, the current supplied by the output of the multiplexer 220 is controlled by the reference control terminal 218.

The multiplexer 220 is configured to supply the current supplied to either of the reference input terminals 214 or 216 to the comparators 222 and 224 based on the reference control terminal 218. For example, the multiplexer 220 supplies a current approximately (preferably exactly) equal to the current supplied to the first reference input terminal 214 to the comparators 222 and 224, as a result of the reference control terminal 218 being set to a logic high. Advantageously, the current supplied to the comparators is determined based on the reference control terminal 218.

A first comparator terminal (e.g., the non-inverting input) of the first comparator 222 is coupled to the fifth USB terminal 150. A second comparator terminal (e.g., the inverting input) of the first comparator 222 is coupled to the multiplexer 220. A third comparator terminal of the first comparator 222 is coupled to the first supply terminal 226. A fourth comparator terminal of the first comparator 222 is coupled to the first termination indication terminal 228. The first comparator 222 is configured to receive a non-inverting (+) input from the fifth USB terminal 150 and an inverting (−) input from the multiplexer 220. The first comparator 222 is configured to output to the first termination indication terminal 228. The first comparator 222 is configured to be supplied power by the first supply terminal 226. The first comparator 222 is configured to set the value of the first termination indication terminal 228 based on a comparison of the fifth USB terminal 150 and the output of the multiplexer 220. For example, the first termination indication terminal 228 is set to a logic high as a result of the current of the fifth USB terminal 150 being greater than the current supplied by the multiplexer 220. In some such examples, the first comparator 222 compares the comparator terminals to determine if pulldown circuitry (e.g., the resistors 112 and 116 of FIG. 1 coupled to the switches 114 and 118 of FIG. 1) is coupled to the non-inverting by determining the current of the fifth USB terminal is less than the current supplied to the inverting input by the multiplexer 220. For example, the first termination indication terminal 228 is equal to a logic low as a result of the current supplied by the fifth USB terminal 150 being less than the current supplied by the multiplexer 220. Advantageously, the first termination indication terminal 228 represents whether or not the USB terminals 150 and 152 are coupled to pulldown circuitry.

A first comparator terminal of the second comparator 224 is coupled to the sixth USB terminal 152. A second comparator terminal of the second comparator 224 is coupled to the multiplexer 220. A third comparator terminal of the second comparator 224 is coupled to the second supply terminal 230. A fourth comparator terminal of the second comparator 224 is coupled to the second termination indication terminal 232. The second comparator 224 is configured to receive a non-inverting (+) input from the sixth USB terminal 152 and an inverting (−) input from the multiplexer 220. The second comparator 224 is configured to output to the second termination indication terminal 232. The second comparator 224 is configured to be supplied power by the second supply terminal 230. The second comparator 224 is configured to set the value of the second termination indication terminal 232 based on a comparison of the sixth USB terminal 152 and the output of the multiplexer 220. For example, the second termination indication terminal 232 is set to a logic high as a result of the current of the sixth USB terminal 152 being greater than the current supplied by the multiplexer 220. In some such examples, the second comparator 224 is configured to determine if pulldown circuitry is coupled to the non-inverting by determining the current of the sixth USB terminal 152 is less than the current supplied to the inverting input by the multiplexer 220. For example, the second termination indication terminal 232 is equal to a digital low as a result of the current supplied by the fifth USB terminal being less than the current supplied by the multiplexer 220. Advantageously, the second termination indication terminal 232 represents whether or not the USB terminals 150 and 152 are coupled to pulldown circuitry.

In the example of FIG. 2, the second termination indication terminals 228 and 232 may be coupled to the third controller 148, such that the third controller 148 may open and/or close the switches 176 and 180 to replicate the operation mode of the primary device 102 within the downstream circuitry 144. Advantageously, the high-speed termination detection circuitry 168 is able to determine whether or not pulldown circuitry is coupled to and enabled on the USB terminals 150 and 152 without determining the voltage of the USB terminals 150 and 152.

In example operation, the current mode drivers 206 and 212 supply a current of the first magnitude or the second magnitude individually to each of the USB terminals 150 and 152 based on the source control terminals 202, 204, 208, and 210. The reference control terminal 218 configures the multiplexer 220 to supply a current equal to the reference input terminal 214 or 216 based on whether the current is being supplied by first current mode driver 206 or the second current mode driver 212. The first comparator 222 sets the first termination indication terminal 228 as a result of determining that the current supplied by the fifth USB terminal 150 is greater than the current supplied by the multiplexer 220. The second comparator 224 sets the second termination indication terminal 232 as a result of determining that the current supplied by the sixth USB terminal 152 is greater than the current supplied by the multiplexer 220.

Advantageously, the operation mode of the primary device 102 may be determined based on the controller 148 being coupled to the high-speed termination detection circuitry 168. Advantageously, the high-speed termination detection circuitry 168 determines whether or not the USB terminals 150 and 152 without the need for a precise clock. Advantageously, the high-speed termination detection circuitry 168 includes a plurality of current mode drivers to supply currents of different magnitudes to the USB terminals 150 and 152.

Figure 3A:
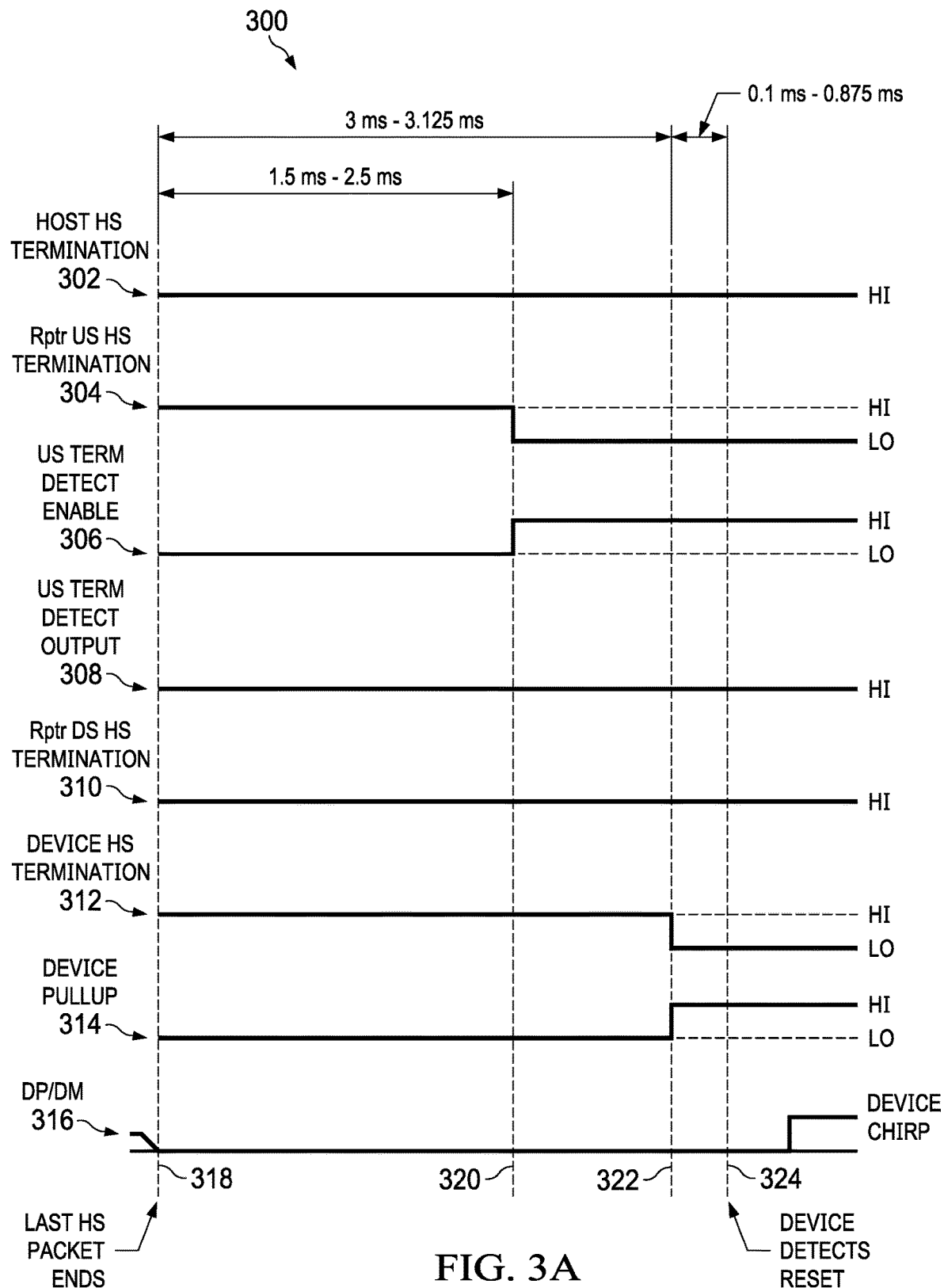
FIG. 3A is an example first timing diagram of an example operation to detect a reset state using the USB repeater circuitry of FIG. 1 including the high-speed termination detection circuitry of FIGS. 1 and 2.

FIG. 3A is an example first timing diagram 300 of an example operation to detect a reset state using the USB repeater circuitry 106 of FIG. 1 including the high-speed termination detection circuitry 168 of FIGS. 1 and 2. In the example of FIG. 3A, the first timing diagram 300 includes a first host high-speed termination 302, a first repeater upstream high-speed termination 304, a first upstream termination detection enable 306, a first upstream termination detection output 308, a first repeater downstream high-speed termination 310, a first secondary device high-speed termination 312, a first secondary device pullup 314, and a first USB terminal voltage (DP/DM) 316. The first timing diagram 300 represents the operations of the USB communications system 100 of FIG. 1 during an example transition of the primary device 102 of FIG. 1 into a reset state, such that the operation mode of the primary device 102 remains in a high-speed mode.

In the example of FIG. 3A, the first host high-speed termination 302 is configured to represent whether or not the switches 114 and 118 of FIG. 1 of the primary device 102 are closed by the first controller 120 of FIG. 1. The first host high-speed termination 302 represents the switches 114 and 118 being closed as a logic high (HI) and open as a logic low (LO). The first host high-speed termination 302 represents the mode of the primary device 102. For example, the primary device 102 is operating in high-speed mode during the duration wherein the first host high-speed termination 302 is a logic high, or the primary device 102 is operating in full-speed mode during the duration wherein the first host high-speed termination 302 is a logic low.

The first repeater upstream high-speed termination 304 is configured to represent whether or not the switches 156 and 160 of the upstream circuitry 142 of FIG. 1 are closed by the third controller 148 of FIG. 1. The first repeater upstream high-speed termination 304 represents the switches 156 and 160 being closed as a logic high and open as a logic low. The first repeater upstream high-speed termination 304 represents the state of the upstream circuitry 142. A transition of the first repeater upstream high-speed termination 304 indicates that either the USB repeater circuitry 106 is determining the state of the primary device 102 or the operation mode of the secondary device 104 has transitioned from one mode to another.

The first upstream termination detection enable 306 is configured to represent whether or not the high-speed termination detection circuitry 168 is enabled. The first upstream termination detection enable 306 represents the high-speed termination detection circuitry 168 being closed as a logic high and open as a logic low. The first upstream termination detection enable 306 represents the duration in which the termination indication terminals 228 and 232 may be used to indicate whether or not the switches 114 and 118 are closed by the primary device 102.

The first upstream termination detection output 308 is configured to represent the termination indication terminals 228 and 232. The first upstream termination detection output 308 represents the termination indication terminals 228 and 232 indicating enabled pulldown circuitry on the USB terminals 150 and 152 of FIGS. 1 and 2 as a logic low and no pulldown circuitry on the USB terminals 150 and 152 as a logic high. The first upstream termination detection output 308 indicates determining the operation of the primary device 102 being high-speed mode as a logic high and another mode as logic low.

The first repeater downstream high-speed termination 310 is configured to represent whether or not the switches 176 and 180 of FIG. 1 of the downstream circuitry 144 are closed by the third controller 148. The first repeater downstream high-speed termination 310 represents the switches 176 and 180 being closed as a logic high and open as a logic low. The first repeater downstream high-speed termination 310 is configured to replicate the mode of the primary device 102.

For example, the first repeater downstream high-speed termination 310 is a logic high to replicate the primary device 102 operating in high-speed mode. A transition in the first repeater downstream high-speed termination 310 indicates that the high-speed termination detection circuitry 168 determined the primary device 102 has opened or closed the switches 114 and 118.

The first secondary device high-speed termination 312 is configured to represent whether or not the switches 128 and 132 of the secondary device 104 are closed by the second controller 140 of FIG. 1. The first secondary device high-speed termination 312 represents the switches 128 and 132 being closed as a logic high and opened as a logic low. The first secondary device high-speed termination 312 represents the state of the secondary device 104. A transition of the first secondary device high-speed termination 312 indicates that either the secondary device 104 is determining the state of the downstream circuitry 144 or the operation mode of the secondary device 104 has transitioned from one mode to another.

The first secondary device pullup 314 is configured to represent whether or not the fifth switch 134 of the secondary device 104 is closed by the second controller 140. The first secondary device pullup 314 represents the fifth switch 134 being closed as a logic high and open as a logic low. A transition of the first secondary device pullup 314 indicates that either the secondary device 104 is determining the state of the downstream circuitry 144 or the operation mode of the secondary device 104 has transitioned into full speed mode.

The first USB terminal voltage 316 is configured to represent the voltage of the USB terminals 108 and 110. The first USB terminal voltage 316 is configured to indicate that the operation mode of the primary device 102, such that a voltage approximately equal to a common potential (e.g., ground) represents high-speed mode and the voltage approximately equal to the first voltage supply 138 of FIG. 1 represents full speed mode.

At an example first time 318, the USB communication system 100 completes a data transmission in high-speed mode. At a second time 320, the USB repeater circuitry 106 configures the upstream circuitry 142 to determine the state of the primary device 102 as a result of determining that there has not been a data transmission in approximately 1.5-2.5 milliseconds (mS). At the second time 320, the first repeater upstream high-speed termination 304 transitions from a logic high to a logic low to indicate that the third controller 148 opened the switches 156 and 160. At the second time 320, the first upstream termination detection enable 306 transitions from a logic low to a logic high to indicate that the third controller 148 has enabled the high-speed termination detection circuitry 168 to determine whether the first host high-speed termination 302 is a logic high or logic low.

At a third time 322, the first secondary device high-speed termination 312 transitions from a logic high to a logic low to indicate that the second controller 140 opened the switches 128 and 132. At the third time 322, the first secondary device pullup 314 transitions from a logic low to a logic high to indicate that the second controller 140 closed the fifth switch 134 to pullup the third USB terminal 122. At the third time 322 the secondary device 104 transitions its circuitry to determine whether or not the first repeater downstream high-speed termination 310 is a logic low. The secondary device 104 is configured to perform the operations of the third time 322 as a result of determining that there has not been a data transmission in approximately 3-3.125 milliseconds (mS).

At a fourth time 324, the secondary device 104 is configured to determine whether the first USB terminal voltage 316 is approximately equal to the voltage of the first voltage supply 138 or the common potential. At the fourth time 324 the secondary device 104 determines whether the primary device 102 is in a reset state or in a suspend state. Advantageously, the USB repeater circuitry 106 replicated the state of the primary device 102 using the downstream circuitry 144 before the fourth time 324.

FIG. 3B is a second timing diagram 326 of an example operation to detect and replicate a suspend state using the USB repeater circuitry 106 of FIG. 1 including the high-speed termination detection circuitry 168 of FIGS. 1 and 2. In the example of FIG. 3B, the second timing diagram 326 includes a second host high-speed termination 328, a second repeater upstream high-speed termination 330, a second upstream termination detection enable 332, a second upstream termination detection output 334, a second repeater downstream high-speed termination 336, a second secondary device high-speed termination 338, a second secondary device pullup 340, and a second USB terminal voltage (DP/DM) 342. The second timing diagram 326 represents the operations of the USB communications system 100 during an example transition of the primary device 102 into a suspend state, such that the operation mode of the primary device 102 transitions high-speed mode to full speed mode.

In the example of FIG. 3B, the second host high-speed termination 328 is configured in a similar manner as the first host high-speed termination 302. The second repeater upstream high-speed termination 330 is configured in a similar manner as the first repeater upstream high-speed termination 304. The second upstream termination detection enable 332 is configured in a similar manner as the first upstream termination detection enable 306. The second upstream termination detection output 334 is configured in a similar manner as the first upstream termination detection output 308. The second repeater downstream high-speed termination 336 is configured in a similar manner as the first repeater downstream high-speed termination 310. The second secondary device high-speed termination 338 is configured in a similar manner as the first secondary device high-speed termination 312. The second secondary device pullup 340 is configured in a similar manner as the first secondary device pullup 314. The second USB terminal voltage 342 is configured in a similar manner as the first USB terminal voltage 316.

At a fifth time 344, the USB communication system 100 completes a data transmission in high-speed mode before the USB communication system 100 transitions to full speed mode. At a sixth time 346, the second host high-speed termination 328 transitions from a logic high to a logic low to indicate that the first controller 120 of FIG. 1 opens the switches 114 and 118. At the sixth time 346, the primary device 102 enters suspend state which indicates a transition from high-speed mode to full speed mode.

At a seventh time 348, the USB repeater circuitry 106 configures the upstream circuitry 142 to determine the state of the primary device 102 as a result of determining that there has not been a data transmission in approximately 1.5-2.5 milliseconds (mS). At the seventh time 348, the second repeater upstream high-speed termination 330 transitions from a logic high to a logic low to indicate that the third controller 148 opened the switches 156 and 160. At the seventh time 348, the second upstream termination detection enable 332 transitions from a logic low to a logic high to indicate that the third controller 148 has enabled the high-speed termination detection circuitry 168 to determine whether the second host high-speed termination 328 is a logic high or logic low. Immediately following the seventh time 348, the second upstream termination detection output 334 transitions from a logic high to a logic low to indicate that the high-speed termination detection circuitry 168 determined that the second host high-speed termination 328 is a logic low.

At an eighth time 350, the second repeater downstream high-speed termination 336 transitions from a logic high to a logic low. At the eighth time 350, the third controller 148 opens the switches 176 and 180 to replicate the primary device 102 opening the switches 114 and 118. Immediately following the eighth time 350, the secondary device 104 may accurately determine whether the primary device 102 is in reset or suspend state.

At a ninth time 352, the second secondary device high-speed termination 338 transitions from a logic high to a logic low to indicate that the second controller 140 disabled the switches 128 and 132. At the ninth time 352, the second secondary device pullup 340 transitions from a logic low to a logic high to indicate that the second controller 140 closed the fifth switch 134 to pullup the third USB terminal 122. At the ninth time 352 the secondary device 104 transitions its circuitry to determine whether or not the second repeater downstream high-speed termination 336 is a logic low. The secondary device 104 is configured to perform the operations of the ninth time 352 as a result of determining that there has not been a data transmission in approximately 3-3.125 milliseconds (mS).

At a tenth time 354, the secondary device 104 is configured to determine whether the second USB terminal voltage 342 is approximately equal to the voltage of the first voltage supply 138 or the common potential. At the tenth time 354 the secondary device 104 determines whether the primary device 102 is in a reset state or in a suspend state. Advantageously, the USB repeater circuitry 106 replicated the state of the primary device 102 using the downstream circuitry 144 before the tenth time 354.

Figure 4:
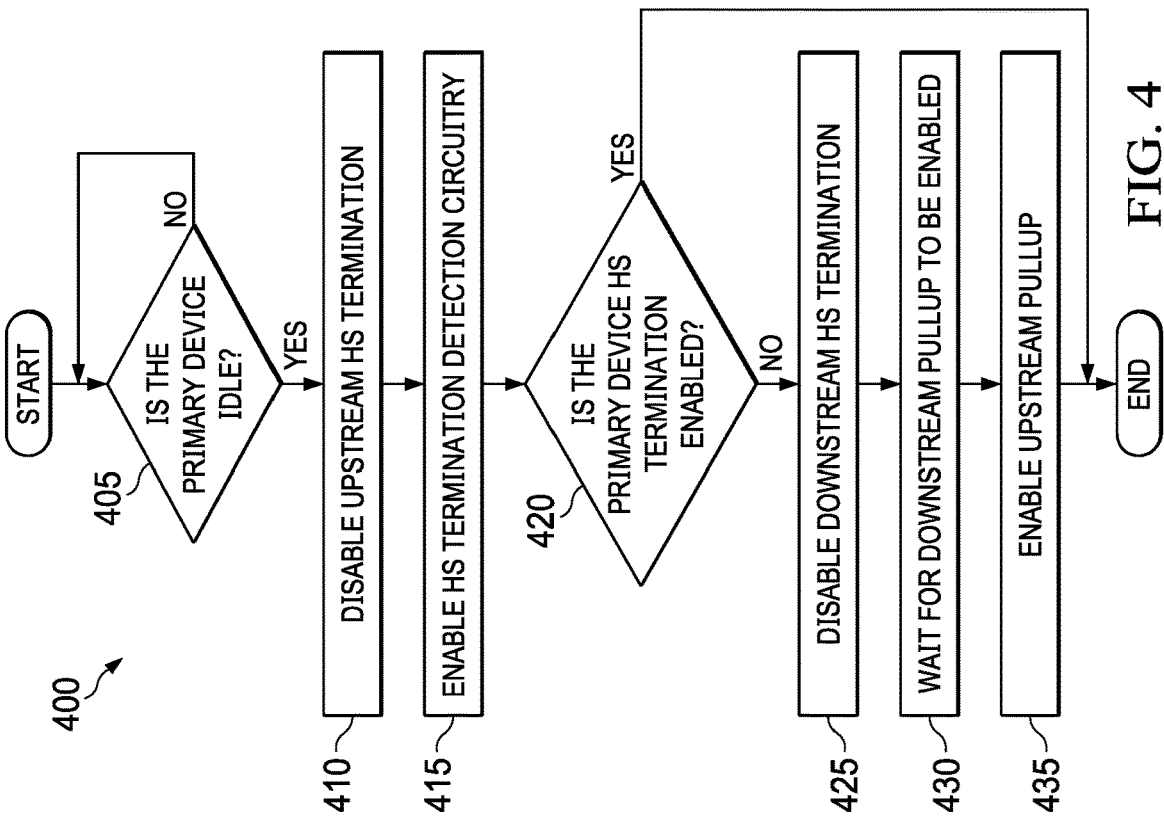
FIG. 4 is a flowchart representative of an example process to determine and/or replicate a USB communication mode.

FIG. 4 is a flowchart representative of an example process that may be performed using machine readable instructions that can be executed and/or hardware configured to implement the USB repeater circuitry 106 of FIG. 1, and/or, more generally, the high-speed termination detection circuitry 168 of FIGS. 1 and 2 to determine and/or replicate the state of the primary device 102 of FIG. 1. The machine-readable instructions and/or the operations 400 of FIG. 4 begin at block 405, at which the USB repeater circuitry 106 determines if the primary device is idle.

At block 405, the USB repeater circuitry 106 determines, based on the third controller 148 of FIG. 1 and the logic isolation circuitry 146, whether or not there has been any USB communication within a set duration, such as to determine whether or not the primary device 102 is idle. For example, the logic isolation circuitry 146 is configured to reset a timer in the third controller 148 every time there is a USB communication. In such an example, the third controller 148 is configured to determine the primary device 102 is idle as a result of the timer reaching 1.5 to 2.5 milliseconds (mS). The block 405 corresponds to the times 320 and 348 of FIGS. 3A and 3B, respectively. The duration used to determine whether the primary device 102 is idle may depend on a USB protocol (e.g., USB 2.0 protocol which is incorporated herein in its entirety). For example, the third controller 148 may determine that the primary device 102 is idle as a result of a duration greater than 125 microseconds (µS) since the last USB communication.

If at block 405, the third controller 148 determines that the primary device 102 is not idle, then the third controller 148 is configured to wait for the primary device 102 to be idle. If at block 405, the third controller 148 determines that the primary device 102 is idle, then the process continues to block 410.

At block 410, the third controller 148 disables the upstream high-speed (HS) termination. At block 410, the third controller 148 opens the switches 156 and 160 of the upstream circuitry 142 of FIG. 1, such that the USB terminals 150 and 152 are not pulled down by the upstream circuitry 142. At block 410, the upstream circuitry 142 is transitioning from high-speed mode to determine whether or not the USB terminals 150 and 152 are being pulled down by the primary device 102. The block 410 corresponds to the times 320 and 348 of FIGS. 3A and 3B, respectively. At block 410, the USB repeater circuitry 106 may no longer be able to determine whether or not there is high-speed USB communications as a result of the high-speed circuitry being removed in the upstream circuitry 142. The process proceeds to block 415.

At block 415, the third controller 148 enables the high-speed termination detection circuitry 168. At block 415, the third controller 148 enables either the first current mode driver 206 and/or the second current mode driver 212 to supply a current to the USB terminals 150 and 152. The block 415 corresponds to the times 320 and 348 of FIGS. 3A and 3B, respectively. The process proceeds to block 420.

At block 420, the high-speed termination detection circuitry 168 determines whether or not the primary device high-speed termination is enabled. At block 420, the third controller 148 determines whether the termination indication terminals 228 and 232 of FIG. 2 are equal to a logic high or a logic low. For example, the third controller 148 determines that the high-speed termination is enabled as a result of the termination indication terminals 228 and 232 being a logic high. The block 420 corresponds to a time immediately following the times 320 and 348.

If at block 420, the third controller 148 determines that the primary device 102 has the high-speed termination enabled, then the third controller 148 determines that the primary device 102 is in a reset state and ends the process. Alternatively, the third controller 148 may be configured to end the process after determining a chirp voltage on the USB terminals 170 and 172 as a result of the secondary device 104 supplying a test current to the USB terminals 122 and 124. If at block 420 the third controller 148 determines that the primary device 102 has the high-speed termination disabled, then the process proceeds to block 425.

At block 425, the third controller 148 disables the downstream high-speed termination. At block 425, the third controller 148 opens the switches 176 and 180 of the downstream circuitry 144 of FIG. 1, such that the USB terminals 170 and 172 are not pulled down by the downstream circuitry 144. At block 425, the downstream circuitry 144 is transitioning from high-speed mode to full speed mode to replicate the transition of the primary device 102 to suspend state. The block 425 corresponds to the eighth time 350 of FIG. 3B. The process proceeds to block 430.

At block 430, the third controller 148 waits for a downstream pullup to be enabled. At block 430, the third controller 148 is configured to wait for the second controller 140 to close the fifth switch 134 of FIG. 1, such that the third USB terminal 122 of FIG. 1 is pulled up by the fifth resistor 136 of FIG. 1. The logic isolation circuitry 146 of FIG. 1 may be configured to determine that the secondary device 104 was disconnected from the USB repeater circuitry 106 as a result of waiting for the downstream pullup for a duration greater than a threshold. The process proceeds to block 435.

At block 435, the third controller 148 enables the upstream pullup. At block 435, the third controller 148 closes the eighth switch 162, such that the eighth resistor 164 pulls up the fifth USB terminal 150. At block 435, the third controller 148 is configuring the upstream circuitry 142 for full speed mode as a result of determining that the primary device 102 entered suspend state. At block 435, the USB communication system 100 is configured to operate in full speed mode. The process proceeds to end.

Although example methods are described with reference to the flowchart illustrated in FIG. 4, many other methods of high-speed termination detection may alternatively be used in accordance with the in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 5:
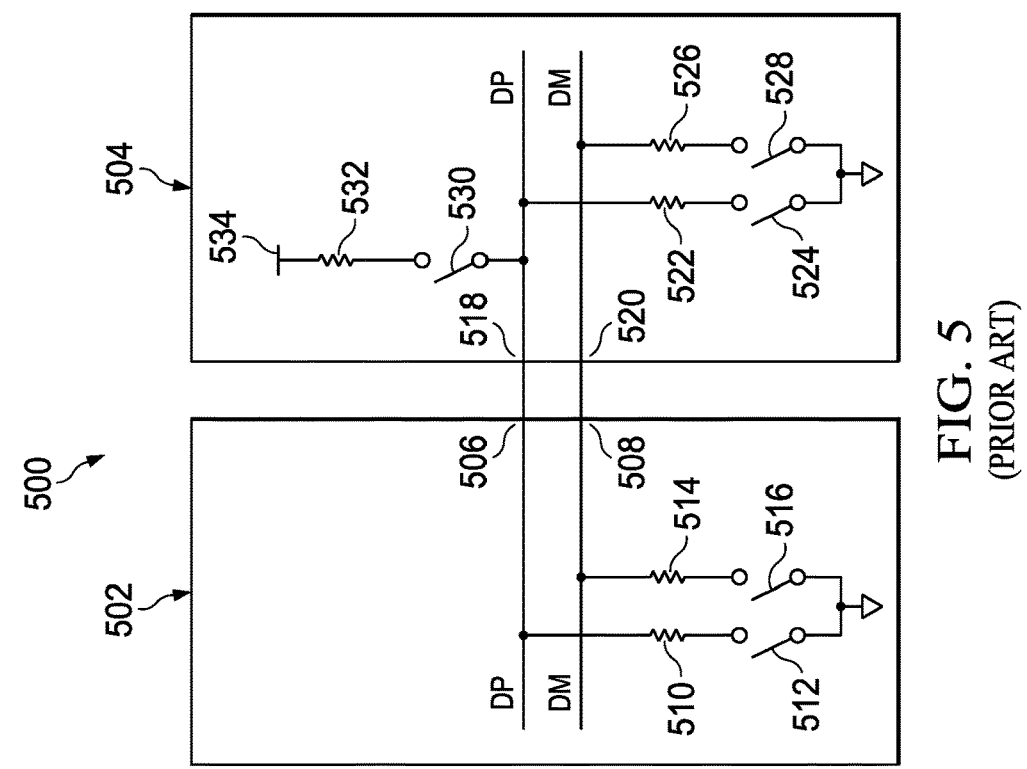
FIG. 5 is a schematic diagram of a conventional USB communication system.

FIG. 5 is a schematic diagram of a conventional USB communication system 500. The conventional USB communication system 500 includes a primary device 502 and a secondary device 504. The conventional USB communication system 500 is configured for USB communication between the primary device 502 and the secondary device 504.

The primary device 502 includes a first USB terminal 506, a second USB terminal 508, a first resistor 510, a first switch 512, a second resistor 514, and a second switch 516. The primary device 502 is configured to transmit data to the secondary device 504 through the USB terminals 506 and 508. Alternatively, the primary device 502 is configured to receive data from the secondary device 504 through the USB terminals 506 and 508.

The first resistor 510 is coupled between the first USB terminal 506 and the first switch 512. The first switch 512 is coupled between the first resistor 510 and a common potential (e.g., ground). The first resistor 510 and the first switch 512 are configured to pulldown the first USB terminal 506. The second resistor 514 is coupled between the second USB terminal 508 and the second switch 516. The second switch 516 is coupled between the second resistor 514 and common potential. The second resistor 514 and the second switch 516 are configured to pulldown the second USB terminal 508.

The secondary device 504 includes a third USB terminal 518, a fourth USB terminal 520, a third resistor 522, a third switch 524, a fourth resistor 526, a fourth switch 528, a fifth switch 530, a fifth resistor 532, and a voltage supply 534. The secondary device 504 is configured to transmit data to the primary device 502 through the USB terminals 518 and 520. Alternatively, the secondary device 504 is configured to receive data from the primary device 502 through the USB terminals 518 and 520.

The third resistor 522 is coupled between the third USB terminal 518 and the third switch 524. The third switch 524 is coupled between the third resistor 522 and common potential. The third resistor 522 and the third switch 524 are configured to pulldown the third USB terminal 518. The fourth resistor 526 is coupled between the fourth USB terminal 520 and the fourth switch 528. The fourth switch 528 is coupled between the fourth resistor 526 and common potential. The fourth resistor 526 and the fourth switch 528 are configured to pulldown the fourth USB terminal 520.

The fifth switch 530 is coupled between the third USB terminal 518 and the fifth resistor 532. The fifth resistor 532 is coupled between the fifth switch 530 and the voltage supply 534. The fifth switch 530 and the fifth resistor 532 are configured to pullup the third USB terminal 518 based on the value of the voltage supply 534.

In example operation, the primary device 502 begins operation in full speed mode, such that the switches 512 and 516 are opened. The secondary device 504 begins operation in full speed mode, such that the switches 524 and 528 are opened and the fifth switch 530 is closed.

In example operation, the primary device 502 determines if the secondary device 504 is high-speed capable by ending data transmissions before closing the switches 512 and 516. The secondary device 504 determines that the primary device 502 closed the switches 512 and 516 as a result of determining the voltage of the USB terminals 518 and 520 changed. The secondary device 504 opens the fifth switch 530 and closes the switches 524 and 528 as a result of the USB terminals 518 and 520 being pulled down by the primary device 502. The USB communication system 500 is configured to high-speed mode as a result of the fifth switch 530 being opened and the switches 512, 516, 524, and 528 being closed.

In example operation, the primary device 502 stops transmitting data in high-speed mode before opening the switches 512 and 516. The secondary device 504 opens the switches 524 and 528 and closes the fifth switch 530 as a response to determining a duration of time passed since the primary device 502 has transmitted data. The secondary device 504 determines the voltage of the USB terminals 518 and 520 to determine whether the primary device is pulling down the USB terminals 518 and 520. The secondary device 504 may open the fifth switch 530 and close the switches 524 and 528 as a result of determining the primary device 502 is pulling down the USB terminals 518 and 520. The secondary device 504 may begin to communicate with the primary device 502 as a result of determining the primary device 502 is not pulling down the USB terminals 518 and 520.

Figure 6A:
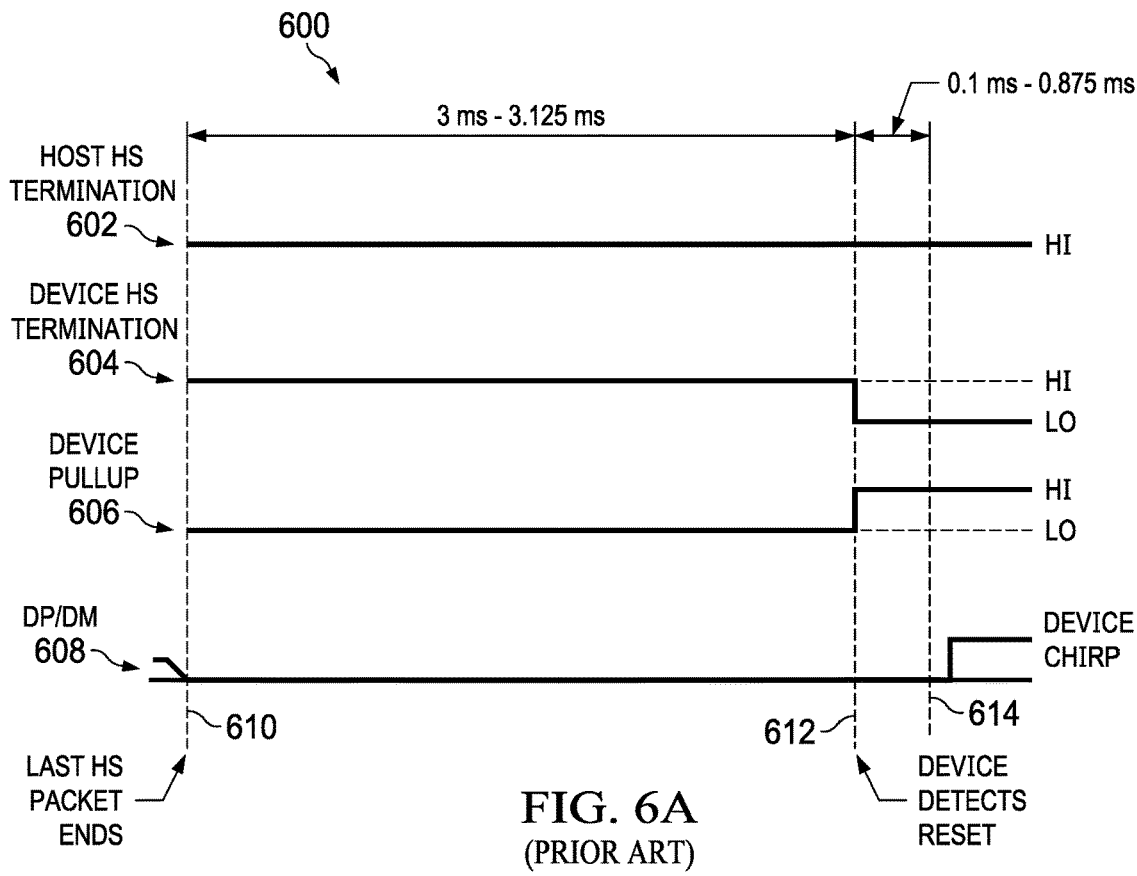
FIG. 6A is a first timing diagram of an operation to detect a reset using the conventional USB communication system of FIG. 5.

FIG. 6A is a first timing diagram 600 of an operation to detect a reset using the conventional USB communication system 500 of FIG. 5. The first timing diagram 600 includes a first host high-speed termination 602, a first secondary device high-speed termination 604, a first secondary device pullup 606, and a first USB terminal voltage (DP/DM) 608. The first timing diagram 600 is configured to represent the operation of the conventional USB communication system 500 during an example operation to determine whether the first host high-speed termination 602 is a logic high or a logic low. The operation of the first timing diagram 600 is configured to determine whether the state of the primary device 502 of FIG. 5 is a suspend state or a reset state. The first timing diagram 600 represents the operations of the USB communication system 500 to remain in high-speed mode, such that the secondary device 504 of FIG. 5 determines that the primary device 502 of FIG. 5 is in the reset state.

The first host high-speed termination 602 is configured to represent whether the switches 512 and 516 of FIG. 5 are opened or closed, such that the first host high-speed termination 602 represents whether or not the USB terminals 506 and 508 of FIG. 5 are being pulled down. The first host high-speed termination 602 is configured to represent the switches 512 and 516 being closed as a logical high (HI) and being open as a logical low (LO).

The first secondary device high-speed termination 604 is configured to represent whether the switches 524 and 528 of FIG. 5 are opened or closed, such that the first secondary device high-speed termination 604 represents whether or not the USB terminals 518 and 520 of FIG. 5 are being pulled down. The first secondary device high-speed termination 604 is configured to represent the switches 524 and 528 being closed as a logical high and being open as a logical low.

The first secondary device pullup 606 is configured to represent whether the fifth switch 530 of FIG. 5 is open or closed, such that the first secondary device pullup 606 represents whether or not the third USB terminal 518 is being pulled up towards the value of the voltage supply 534 of FIG. 5. The first secondary device pullup 606 is configured to represent the fifth switch 530 being closed as a logical high and being open as a logical low.

The first USB terminal voltage 608 is configured to represent a voltage of the USB terminals 506, 508, 518, and 520. The first USB terminal voltage 608 is approximately equal to common potential (e.g., ground) as a result of the USB terminals 506, 508, 518, and 520 being pulled down. The first USB terminal voltage 608 is approximately equal to the voltage of the voltage supply 534 as a result of the USB terminals 506, 508, 518, and 520 being pulled up by the secondary device 504.

At a first time 610, the primary device 502 finishes a high-speed USB communication with the secondary device 504. At a second time 612, the first secondary device high-speed termination 604 transitions from a logical high to a logical low as a result of the secondary device 504 determining that there has been no USB communication in approximately 3-3.125 milliseconds (mS). The transition of the first secondary device high-speed termination 604 at the second time 612 represents the secondary device 504 disabling the circuitry to pulldown the USB terminals 518 and 520. At the second time 612, the first secondary device pullup 606 transitions from a logical low to a logical high to represent the secondary device 504 attempting to determine whether the first host high-speed termination 602 is a logical high or a logical low.

At a third time 614, the secondary device 504 determines whether the first host high-speed termination 602 is a logical high or a logical low, such that the secondary device 504 may determine the state of the primary device 502. At the third time 614, the secondary device 504 measures the voltage of the first USB terminal voltage 608, such the secondary device 504 determines that the primary device 502 is in the reset state.

Figure 6B:
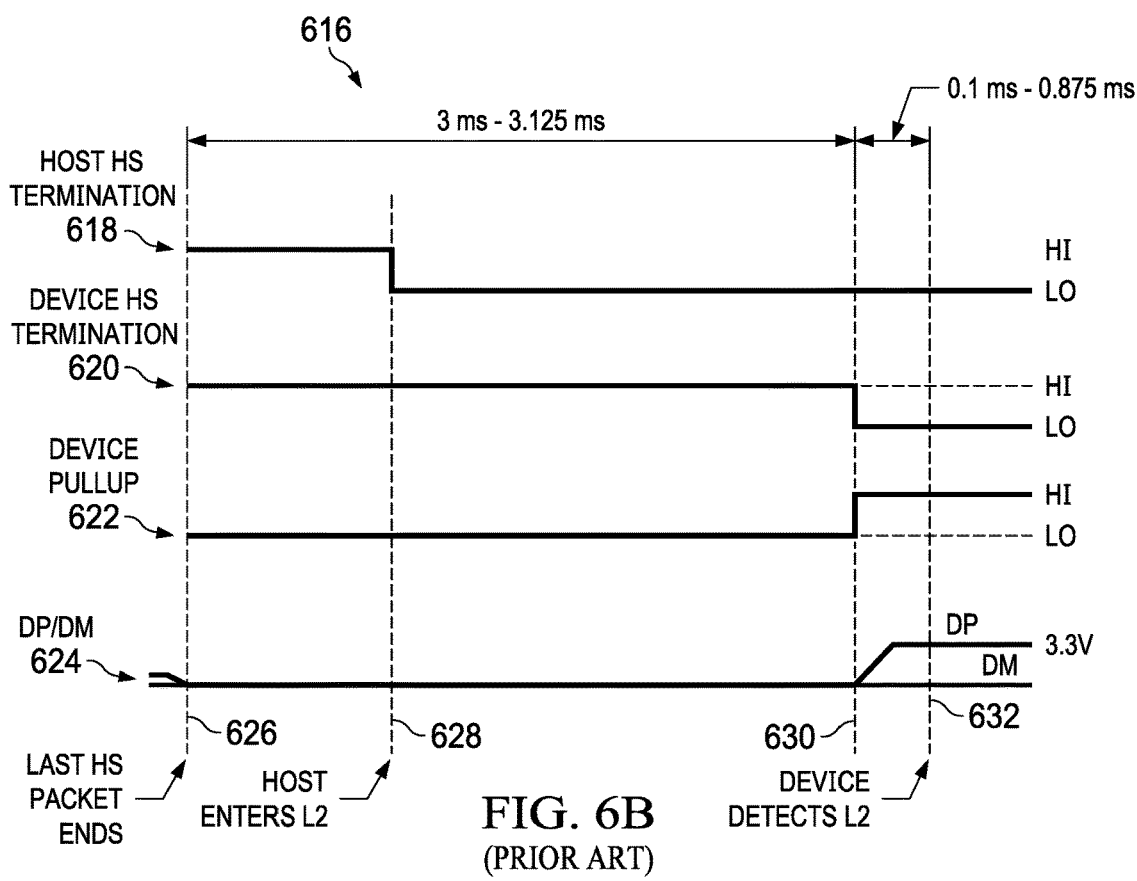
FIG. 6B is a second timing diagram of an operation to detect a high-speed termination using the conventional USB communication system of FIG. 5.

FIG. 6B is a second timing diagram 616 of an operation to detect a high-speed termination using the conventional USB communication system 500 of FIG. 5. The second timing diagram 616 includes a second host high-speed termination 618, a second secondary device high-speed termination 620, a second secondary device pullup 622, and a second USB terminal voltage (DP/DM) 624. The second timing diagram 616 is configured to represent the operation of the conventional USB communication system 500 during an example operation to determine whether the second host high-speed termination 618 is a logic high or a logic low. The operation of the second timing diagram 616 is configured to determine whether the state of the primary device 502 of FIG. 5 is a suspend state (L2) or a reset state. The second timing diagram 616 represents the operations of the USB communication system 500 to remain in high-speed mode, such that the secondary device 504 of FIG. 5 determines that the primary device 502 of FIG. 5 is in the suspend state.

The second host high-speed termination 618 is configured to represent whether the switches 512 and 516 of FIG. 5 are open or closed, such that the second host high-speed termination 618 represents whether or not the USB terminals 506 and 508 of FIG. 5 are being pulled down. The second host high-speed termination 618 is configured to represent the switches 512 and 516 being enabled as a logical high (HI) and being disabled as a logical low (LO).

The second secondary device high-speed termination 620 is configured to represent whether the switches 524 and 528 of FIG. 5 are open or closed, such that the second secondary device high-speed termination 620 represents whether or not the USB terminals 518 and 520 of FIG. 5 are being pulled down. The second secondary device high-speed termination 620 is configured to represent the switches 524 and 528 being closed as a logical high and being open as a logical low.

The second secondary device pullup 622 is configured to represent whether the fifth switch 530 of FIG. 5 is enabled or disabled, such that the second secondary device pullup 622 represents whether or not the third USB terminal 518 is being pulled up towards the value of the voltage supply 534 of FIG. 5. The second secondary device pullup 622 is configured to represent the fifth switch 530 being closed as a logical high and being open as a logical low.

The second USB terminal voltage 624 is configured to represent a voltage of the USB terminals 506, 508, 518, and 520. The second USB terminal voltage 624 is approximately equal to common potential (e.g., ground) as a result of the USB terminals 506, 508, 518, and 520 being pulled down. The second USB terminal voltage 624 is approximately equal to the voltage of the voltage supply 534 as a result of the USB terminals 506, 508, 518, and 520 being pulled up by the secondary device 504.

At a fourth time 626, the primary device 502 finishes a high-speed USB communication with the secondary device 504. At a fifth time 628, the second host high-speed termination 618 transitions from a logical high to a logical low to represent a change in state of the primary device 502 to the suspend state.

At a sixth time 630, the second secondary device high-speed termination 620 transitions from a logical high to a logical low as a result of the secondary device 504 determining that there has been no USB communication in approximately 3-3.125 milliseconds (mS). The transition of the second secondary device high-speed termination 620 at the sixth time 630 represents the secondary device 504 disabling the circuitry to pulldown the USB terminals 518 and 520. At the sixth time 630, the second secondary device pullup 622 transitions from a logical low to a logical high to represent the secondary device 504 attempting to determine whether the second host high-speed termination 618 is a logical high or a logical low.

At a seventh time 632, the secondary device 504 determines whether the second host high-speed termination 618 is a logical high or a logical low, such that the secondary device 504 may determine the state of the primary device 502. At the seventh time 632, the secondary device 504 measures the voltage of the second USB terminal voltage 624, such the secondary device 504 determines that the primary device 502 is in the suspend state.

Figure 7:
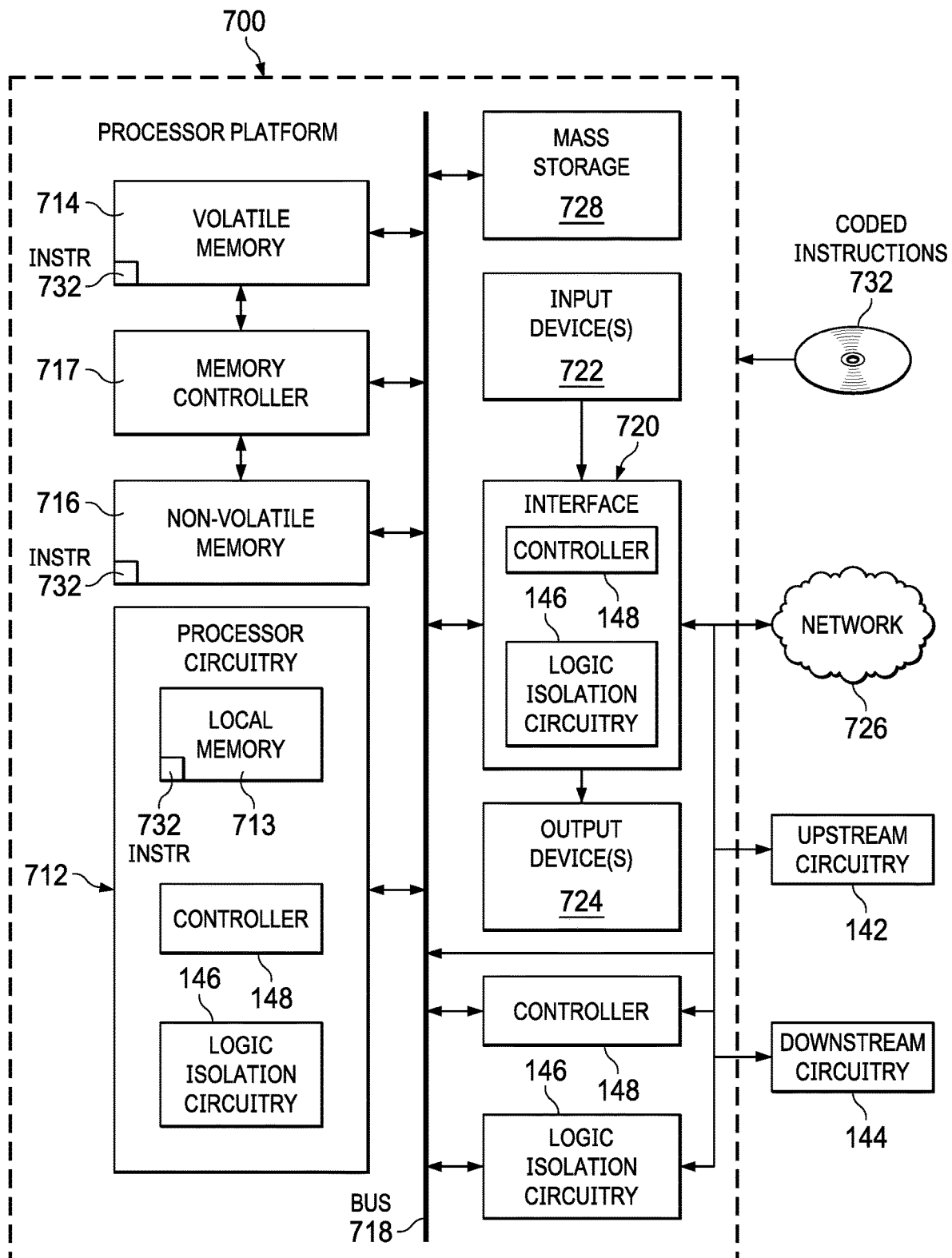
FIG. 7 is a block diagram of an example processing platform including processor circuitry structured to execute the example machine readable instructions and/or the example operations of FIG. 4 to implement the USB repeater circuitry of FIG. 1.

FIG. 7 is a block diagram of an example processing platform including processor circuitry structured to execute the example machine readable instructions and/or the example operations of FIG. 4 to implement the USB repeater circuitry 106 of FIG. 1. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 includes the logic isolation circuitry 146 of FIG. 1 and the third controller 148 of FIG. 1. In this example, the processor circuitry 712 implements the blocks 405-430 of FIG. 4.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random-Access Memory (SDRAM), Dynamic Random-Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717. The logic isolation circuitry 146 and the third controller 148 may be coupled to the bus 718.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. The interface circuitry 720 may be configured to include the logic isolation circuitry 146 and/or the third controller 148.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 732, which may be implemented by the machine-readable instructions of FIG. 4 may be stored in the mass storage device 728, in the volatile memory 714, in the non-volatile memory 716, and/or on a removable non-transitory computer readable storage medium such as a CD or DVD.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a metal-oxide-silicon FET ("MOSFET") (such as an n-channel MOSFET, nMOSFET, or a p-channel MOSFET, pMOSFET), a bipolar junction transistor (BJT—e.g. NPN or PNP), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs). While some example embodiments may implement certain elements/circuits in an integrated circuit while other elements are external to the integrated circuit, in other example embodiments, additional or fewer features may be incorporated into the integrated circuit. In addition, some or all of the features that are external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value.

Modifications are possible in the described embodiments, and other embodiments are possible, within the scope of the claims.

What is claimed is:

1. A system comprising a USB repeater, the USB repeater including:
   an upstream circuit;
   a downstream circuit;
   a controller coupled to the upstream circuit and the downstream circuit; and
   wherein the USB repeater is configured to:
      replicate a transmission to the upstream circuit on the downstream circuit;
      determine whether a duration without USB communications between the upstream circuit and the downstream circuit is greater than a threshold;
      in response to determining the whether the duration without USB communication is greater than the threshold, the controller enables a high-speed termination detection circuit;
      in response to the high-speed termination detection circuit being enabled, the high-speed termination detection circuit compares an output of the upstream circuit to a reference;
      in response to comparing the output of the upstream circuit to the reference, the high-speed termination detection circuit determines whether a state of a device coupled to the upstream circuit is a reset state or a suspend state; and
      in response to determining the state of the device, the controller sets the downstream circuit to replicate the state of the device.

2. The system of claim 1, wherein the USB repeater is configured to replicate USB communication between a primary device coupled to the upstream circuit and a secondary device coupled to the downstream circuit.

3. The system of claim 1, wherein the high-speed termination detection circuit determines the state of the device by enabling circuitry to determine whether or not a resistor is configured to pulldown the output of the upstream circuit.

4. The system of claim 1, wherein the controller is configured to replicate the state of the device by controlling a pulldown circuit coupled to an output of the downstream circuit, wherein disabling the pulldown circuit is to replicate the suspend state.

5. The system of claim 1, wherein the USB repeater includes a logic isolation circuit, the logic isolation circuit is coupled between the upstream circuit and the downstream circuit.

6. The system of claim 5, wherein the logic isolation circuit is configured to supply the downstream circuit a transmission from the upstream circuit.

7. A method of communicating between a primary USB device and a secondary USB device, the method comprising:
   controlling a USB repeater circuit, situated between the primary USB device and the secondary USB device, to replicate a USB communication between the primary USB device and the secondary USB device, the USB repeater circuit having a first terminal and a second terminal coupled to the primary USB device;
   providing current from one or more current source in a high-speed termination detection circuit to each of the first terminal and the second terminal;
   comparing current provided to the first terminal with a reference current to generate a first indication;
   comparing current provided to the second terminal with the reference current to generate a second indication;
   determining a state of the primary USB device is in a suspend state or a reset state based on the first indication and the second indication;
   controlling the USB repeater circuit to replicate a state of the primary USB device; and
   controlling the USB repeater circuit to replicate a state of the secondary USB device.

8. The method of claim 7, wherein the high-speed termination detection circuit determines whether or not a pull-down circuit is enabled by the primary USB device to indicate high-speed USB communication.

9. The method of claim 7, wherein the USB repeater circuit includes a pulldown circuit, which may be controlled to replicate the USB communication in high-speed mode based on the high-speed termination detection circuit.

10. The method of claim 7, wherein a pullup circuit of the second USB device is controlled based on the high-speed termination detection circuit, wherein the pullup circuit is enabled to replicate the USB communication in full speed mode.

\* \* \* \* \*